(12) United States Patent
Tzanidis et al.

(10) Patent No.: US 10,559,874 B2
(45) Date of Patent: Feb. 11, 2020

(54) ELECTRONIC DEVICE INCLUDING LOOP-SHAPED ANTENNA

(71) Applicant: Samsung Electronics Co., Ltd., Gyeonggi-do (KR)

(72) Inventors: Ioannis Tzanidis, Dallas, TX (US); James Vandenheuvel, Mckinney, TX (US); Mitchell Johnson, Mckinney, TX (US); Zhouyue Pi, Allen, TX (US)

(73) Assignee: Samsung Electronics Co., Ltd (KR)

( * ) Notice: Subject to any disclaimer, the term of this patent is extended or adjusted under 35 U.S.C. 154(b) by 401 days.

(21) Appl. No.: 15/326,931

(22) PCT Filed: Jul. 8, 2015

(86) PCT No.: PCT/KR2015/007080
§ 371 (c)(1),
(2) Date: Jan. 17, 2017

(87) PCT Pub. No.: WO2016/010299
PCT Pub. Date: Jan. 21, 2016

(65) Prior Publication Data
US 2017/0207519 A1     Jul. 20, 2017

Related U.S. Application Data

(60) Provisional application No. 62/024,814, filed on Jul. 15, 2014.

(51) Int. Cl.
*H01Q 1/12*     (2006.01)
*H01Q 1/27*     (2006.01)
(Continued)

(52) U.S. Cl.
CPC ............. *H01Q 1/273* (2013.01); *H01Q 1/241* (2013.01); *H01Q 1/38* (2013.01); *H01Q 7/00* (2013.01); *H04B 1/38* (2013.01); *H01Q 1/48* (2013.01)

(58) Field of Classification Search
CPC ......... H04B 2001/3811; H01Q 1/2258; H01Q 1/2291; H01Q 1/24; H01Q 1/242; H01Q 1/273; H01Q 1/38; H01Q 7/00
(Continued)

(56) References Cited

U.S. PATENT DOCUMENTS

2006/0111965 A1    5/2006   Roshkind
2010/0112964 A1    5/2010   Yi et al.
(Continued)

FOREIGN PATENT DOCUMENTS

JP     H0936640     2/1997
JP     2012178695     9/2012
(Continued)

OTHER PUBLICATIONS

PCT/ISA/210 Search Report issued on PCT/KR2015/007080 (pp. 3).

*Primary Examiner* — Dameon E Levi
*Assistant Examiner* — Collin Dawkins
(74) *Attorney, Agent, or Firm* — The Farrell Law Firm, P.C.

(57) ABSTRACT

An electronic device according to various embodiments of the present invention may comprise: a body which is made of a conductive material and has both ends curvedly extending to be adjacent to each other so as to have a loop shape; a communication module arranged on the body; a feeding line which extends from the communication module and is arranged to cross a gap between both ends of the body; and at least one connection terminal for connecting the feeding line to the body, wherein the body can receive a feeding signal from the communication module through the feeding line, and transmit/receive a wireless signal. The above-mentioned electronic device can be implemented variously according to embodiments.

26 Claims, 22 Drawing Sheets

(51) Int. Cl.
*H01Q 1/38* (2006.01)
*H04B 1/38* (2015.01)
*H01Q 1/24* (2006.01)
*H01Q 7/00* (2006.01)
*H01Q 1/48* (2006.01)

(58) Field of Classification Search
USPC .................... 343/718, 878, 906, 908, 702
See application file for complete search history.

(56) References Cited

U.S. PATENT DOCUMENTS

| | | | |
|---|---|---|---|
| 2010/0302122 A1* | 12/2010 | Soler Castany | H01Q 1/242 343/848 |
| 2011/0007035 A1* | 1/2011 | Shai | G06F 3/014 345/179 |
| 2012/0122519 A1* | 5/2012 | Jochheim | H04B 1/385 455/556.1 |
| 2013/0322670 A1 | 12/2013 | Hosoi et al. | |
| 2015/0061950 A1* | 3/2015 | Flores-Cuadras | H01Q 1/243 343/745 |
| 2015/0378321 A1* | 12/2015 | Fraser | G04G 21/04 368/10 |

FOREIGN PATENT DOCUMENTS

| | | |
|---|---|---|
| KR | 1020100050028 | 5/2010 |
| KR | 1020110006201 | 1/2011 |

* cited by examiner

ELECTRONIC DEVICE INCLUDING LOOP-SHAPED ANTENNA

PRIORITY

This application is a National Phase Entry of PCT International Application No. PCT/KR2015/007080, which was filed on Jul. 8, 2015, and claims priority to U.S. Provisional Patent Application No. 62/024,814, which was filed on Jul. 15, 2014, the contents of each of which are incorporated herein by reference.

TECHNICAL FIELD

Various embodiments of the present invention relate to an electronic device. For example, various embodiments of the present invention relate to an electronic device that is capable of performing communication with other electronic devices, a server, or the like through, for example, a network environment.

BACKGROUND ART

With the development of electric, electronic, and information/communication technologies, various types of electronic devices have been variously utilized in daily lives. For example, an early mobile communication service provided a voice call function, a simple message transmission/reception function, or the like, but the service regions of the mobile communication service are being gradually expanded up to various network services, such as Internet, multimedia services, and banking/security services. In addition, mobile communication terminals have been improved to such an extent so as to enable various service connections while being miniaturized to be portable any time, and it has become possible to set or control electronic devices located at different spaces through a mobile communication terminal and a network.

Electronic devices that are portable by a user are gradually developed to be wearable on a human body, through which it is expected that various types of services will be provided even in medical fields, such as health care. For example, a medical service (health care of a patient have a disease, such as diabetes or high blood pressure), virtual reality, augmented reality, and so on can be variously implemented through a wrist-wearable or face-wearable electronic device. Such body-wearable electronic devices may be in the form of a wrist watch, eyeglasses, a necklace, or the like, and may be configure to be wearable on an arm, a leg, or any portion of a user's body.

DETAILED DESCRIPTION OF THE INVENTION

Technical Problem

By reducing the size and weight of an electronic device, it is possible to make the electronic device wearable on a body, while providing a convenient wearing feeling to a user. In addition, as the size and weight of the electronic device are reduced, some functions of the electronic device may be limited. For example, an input/output device, such as a display device or a keyboard, may be made smaller than that of an ordinary mobile communication terminal or a tablet PC, or may be omitted, and battery capacitance or the like may be considerably reduced. In addition, in the body-wearable electronic device, there are more constraints in designing and arranging an antenna or the like by the reduced space. Accordingly, in implementing a body-wearable electronic device, many efforts may be needed to maximizing or optimizing the performance of the electronic device while reducing the size and weight of the electronic device.

Thus, various embodiments of the present invention are to provide an electronic device that enables an internal space to be efficiently used while being reduced in size and weight.

In addition, various embodiments of the present invention are to provide an electronic device that enables antennas to be easily arranged therein while being miniaturized to be wearable on a body.

Further, various embodiments of the present invention are to provide an electronic device that is capable of providing an improved wearing feeling by suppressing or alleviating internally generated heat from being transferred to a body.

Technical Solution

According to various embodiments of the present invention, an electronic device may include: a main body that is made of a conductive material and has opposite ends extending in a curved form to be adjacent to each other so as to form a loop shape; a communication module disposed on the main body; a feeding line extending from the communication module, and disposed across a gap between the opposite ends of the main body; and at least one connection terminal that connects the feeding line to the main body.

The main body may receive a feeding signal from the communication module through the feeding line, and may transmit/receive a wireless signal.

In the electronic device as described above, the main body may have a ring shape, and at least one of a battery, a power management module, a motion sensing sensor module, a vibration module, a sound module, and a Micro Controller Module (MCU) is disposed on an inner or outer surface of the main body may be arranged along a circumferential direction of the main body together with communication module.

In addition, an electronic device according to various embodiments of the present invention transmits/receives a Radio Frequency (RF) signal. The electronic device may include:

a. an antenna that is partially formed of a conductive material to transmit/receive the RF signal, and has a cross section having a width and a thickness and a donut ring shape having a diameter, the antenna having at least one discontinuous portion that forms a narrow gap;

b. at least one recess formed on an inner or outer surface of the antenna, and having a width and a depth, the recess being formed to be continued along most of a circumference of the antenna;

c. a flexible printed circuit board installed within the recess, and including a conductive layer that is connected to at least one of a battery, a power management module, a motion sensing sensor module, a vibration module, a sound module, and an MCU that are disposed in the narrow gap or the recess; and d. an insulator layer filled in the recess to conceal electronic components including the flexible printed circuit board.

Advantageous Effects

An electronic device according to various embodiments of the present invention may have, for example, a ring shape that is wearable on a user's finger, and electronic components, such as a communication module and a battery, may be arranged along the circumferential direction of the ring-shaped main body. For example, electronic components, which correspond to a function intended to implement through the electronic device, may be properly arranged. In addition, by cutting a portion of the loop-shaped (or ring-shaped) main body to form a narrow gap, and providing a feeding line across the narrow gap, the gap may be utilized as a radiating conductor (e.g., an antenna). Thereby, the electronic device may be equipped with a wireless communication function while being miniaturized to be wearable on a body. In addition, by forming metal fins on the main body and causing the metal fins to be in contact with the electronic components, and by further increasing a contact area with air, it is possible to improve a heat radiation performance. For example, it is possible to stabilize the operation of the electronic device. Further, by forming wrinkles or curves on a portion to be in contact with the user's body to reduce a body contact area, and securing a route through which air can flow, it is possible to further improve the wearing feeling and the heat radiating performance of the electronic device.

MODE FOR CARRYING OUT THE INVENTION

Figure 1:
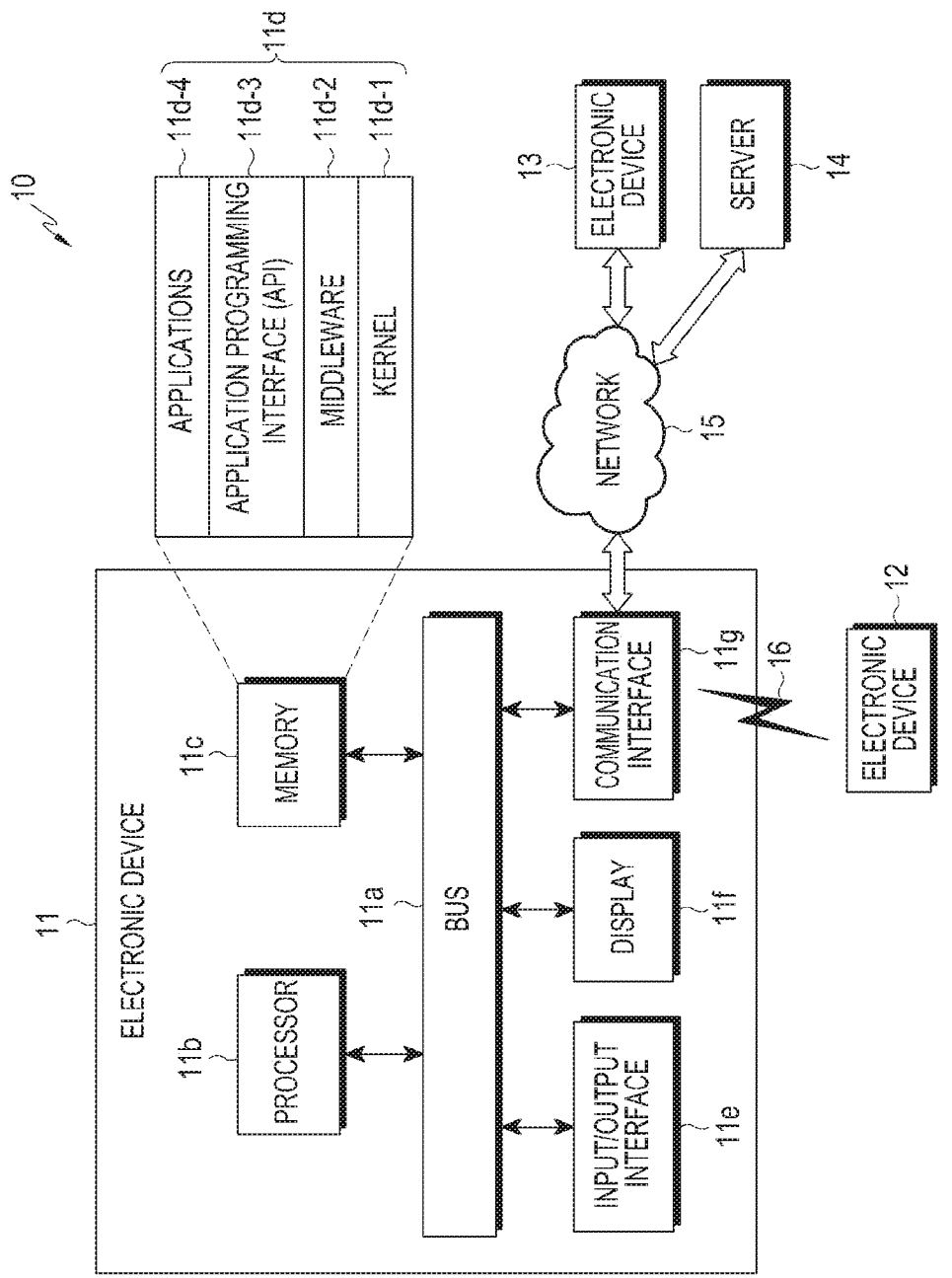
FIG. 1 is a view illustrating a network environment that includes an electronic device according to various embodiments of the present invention.

Hereinafter, various embodiments of the present invention will be described with reference to the accompanying drawings. However, it should be understood that there is no intent to limit the present invention to the particular forms disclosed herein; rather, the present invention should be construed to cover various modifications, equivalents, and/or alternatives of embodiments of the present invention. In describing the drawings, similar reference numerals may be used to designate similar constituent elements.

In the various embodiments of the present invention, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present invention may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present invention.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present invention may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

In the present invention, the terms are used to describe specific embodiments, and are not intended to limit the present invention. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present specification. In some cases, even the term defined in the present invention should not be interpreted to exclude embodiments of the present invention.

In the present invention, an electronic device may be a random device having an antenna (antennas), and the electronic device may be called a terminal, a portable terminal, a mobile terminal, a communication terminal, a portable communication terminal, a portable mobile terminal, a display device or the like.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

FIG. 1 is a view illustrating a network environment 10 that includes an electronic device 11 according to various embodiments of the present invention.

Descriptions will be made on an electronic device 11 within a network environment 10 in various embodiments with reference to FIG. 1. The electronic device 11 may include a bus 11a, a processor 11b, a memory 11c, an input/output interface 11e, a display 11f, and a communication interface 11g. In a certain embodiment, at least one of the above-mentioned components may be omitted from the electronic device 11 or the electronic device 10 may additionally include other components.

The bus 11a may include, for example, a circuit that connects the above-mentioned components 11a to 11g and transmits communication (e.g., a control message and/or data) between the components.

The processor 11b may include one or more of a Central Processing Unit (CPU), an Application Processor (AP), and a Communication Processor (CP). The processor 11b may execute, for example, an arithmetic operation or data processing that is related to a control and/or communication of one or more other components of the electronic device 11.

The memory 11c may include a volatile memory and/or a non-volatile memory. The memory 11c may store, for example, commands or data that are related to one or more other components of the electronic device 11. According to one embodiment, the memory 11c may store software and/or a program 11d. The program 11d may include, for example, a kernel 11d-1, a middleware 11d-2, an Application Programming Interface (API) 11d-3, and/or an application program (or an "application") 11d-4. At least one of the kernel 11d-1, the middleware 11d-2, and the API 11d-3 may be referred to as an Operating System (OS).

The kernel 11d-1 may control or manage, for example, system resources (e.g., the bus 11a, the processor 11b, or the memory 11c) that are used for executing operations or functions implemented in the other programs (e.g., the middleware 11d-2, the API 11d-3, or the application programs 11d-4). In addition, the kernel 11d-1 may provide an interface that allows the middleware 11d-2, the API 11d-3, or the application program 11d-4 to access individual components of the electronic device 11 so as to control or manage the system resources.

The middleware 11d-2 may play an intermediary role such that, for example, the API 11d-3 or the application programs 11d-4 may communicate with the kernel 11d-1 so as to exchange data.

In addition, the middleware 11d-2 may process one or more task requests according to priority. For example, the middleware 11d-2 may assign the priority to be capable of using a system resource of the electronic device 11 (e.g., the bus 11a, the processor 11b, or the memory 11c) to at least one application program 11d-4. For example, the middleware 11d-2 may perform scheduling, load balancing, or the like for the one or more task requests by processing the one or more task requests according to the priority assigned to the at least one application program 11d-4.

The API 11d-3 is, for example, an interface that allows the application 11d-4 to control functions provided from the kernel 11d-1 or the middleware 11d-2, and may include, for example, one or more interfaces or functions (e.g., commands) for a file control, a window control, an image processing, or a character control.

The input/output interface 11e may serve as an interface to transmit commands or data that are entered from, for example, a user or any other external device, to the other component(s) of the electronic device 11. Also, the input/output interface 11e may output commands or data, which are received from the other component(s) of the electronic device 11, to the user or the other external device.

The display 11f may include, for example, a Liquid Crystal Display (LCD), a Light Emitting Diode (LED) display, an Organic Light Emitting Diode (OLED) display, or a MicroElectroMechanical systems (MEMS) display, or an electronic paper display. The display 11f may display various contents (e.g., text, image, video, icon, or symbol) to, for example, the user. The display 11f may include a touch screen, and may receive a touch input, a gesture input, a proximity input, or a hovering input that is made using, for example, an electronic pen or a part of the user's body.

The communication interface 11g may set, for example, communication between the electronic device 11 and an external device (e.g., a first external electronic device 12, a second external device 13, or a server 14). For example, the communication interface 11g may communicate with the external device (e.g., the second external electronic device 13 or the server 14) by being connected with a network 15 through wired or wireless communication.

The wireless communication may use at least one of, for example, Long-Term Evolution (LTE), LTE Advance (LTE-A), Code Division Multiple Access (CDMA), Wideband CDMA (WCDMA), Universal Mobile Telecommunication System (UMTS), Wireless Broadband (WiBro), or Global System for Mobile communication (GSM), as a cellular communication protocol. In addition, the wireless communication may include, for example, short range communication 16. The short range communication 16 may include at least one of, for example, Wireless Fidelity (WiFi), Bluetooth, Near Field Communication (NFC), and Global Navigation Satellite System (GNSS). GNSS may include, for example, at least one of Global Positioning System (GPS), Global Navigation Satellite System (Glonass), Beidou Navigation Satellite System (hereinafter, "Beidou"), Galileo, and the European global satellite-based navigation system. Herein, "GPS" may be interchangeably used with "GNSS" below. The wired communication may use at least one of, for example, Universal Serial Bus (USB), High Definition Multimedia Interface (HDMI), Recommended Standard-232 (RS-232), and Plain Old Telephone Service (POTS). The network 15 may include a telecommunication network, for example, at least one of a computer network (e.g., LAN or WAN), the internet, and a telephone network.

Each of the first and second external electronic devices 12 and 13 may be a type of device that is the same as or different from the electronic device 11. According to one embodiment, the server 14 may include a group of one or more servers. According to various embodiments, all or some of the operations to be executed by the electronic device 11 may be executed by another electronic device or a plurality of other electronic devices (e.g., the electronic devices 12 and 13 or the server 14). According to one embodiment, in the case where the electronic device 11 should perform a certain function or service automatically or by a request, the electronic device 11 may request some functions or services that are associated therewith from the other electronic devices (e.g., the electronic devices 12 and 13 or the server 14), instead of, or in addition to, executing the functions or service by itself. The other electronic devices (e.g., the electronic devices 12 and 13 or the server 14) may execute the requested functions or additional functions, and may deliver the results to the electronic device 11. The electronic device 11 may provide the requested functions or services by processing the received results as they are or additionally. For this purpose, for example, a cloud computing technique, a distributed computing technique, or a client-server computing technique may be used.

Figure 2:
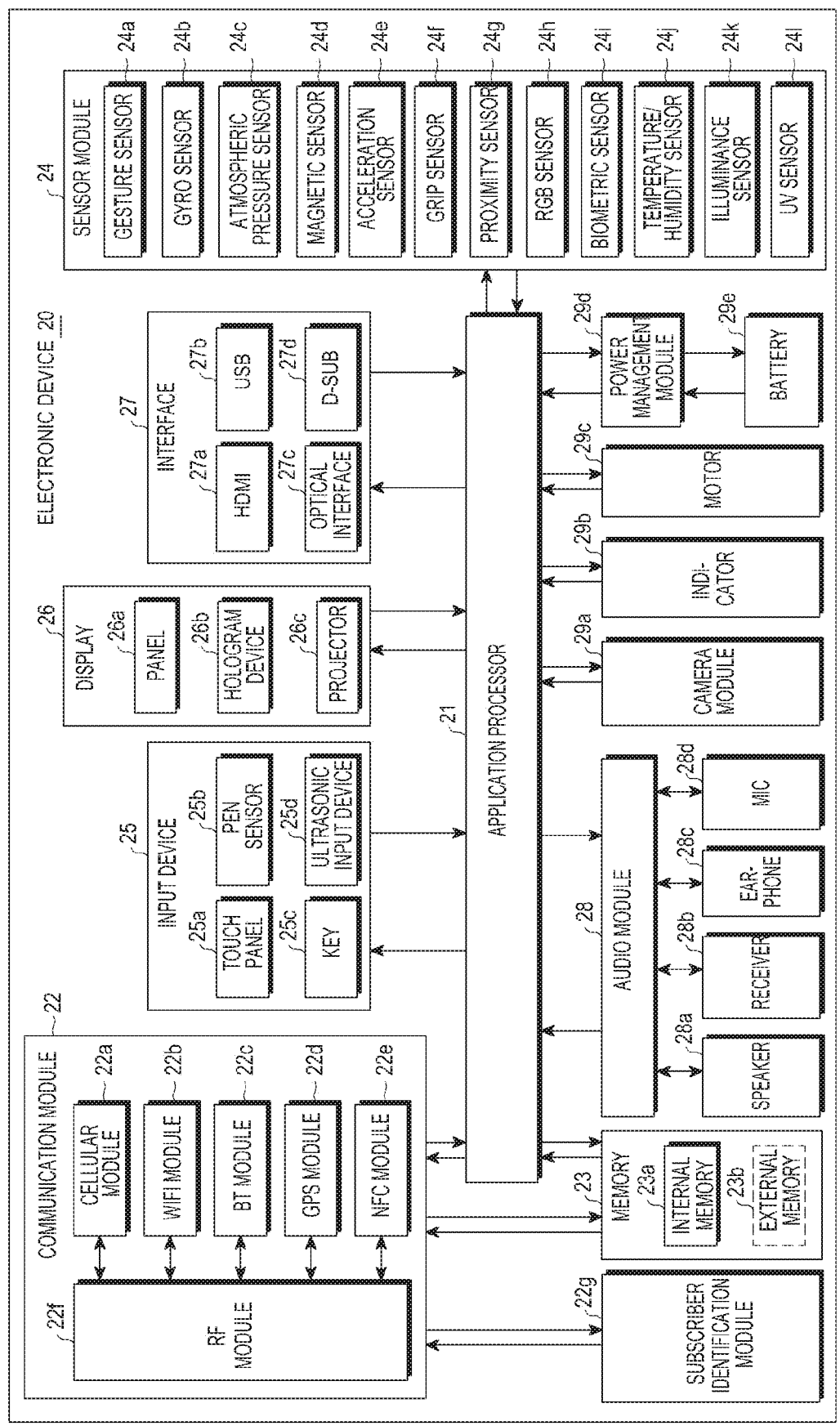
FIG. 2 is a block diagram illustrating an electronic device according to various embodiments of the present invention.

FIG. 2 is a block diagram illustrating an electronic device 20 according to various embodiments of the present invention.

Figure 11:
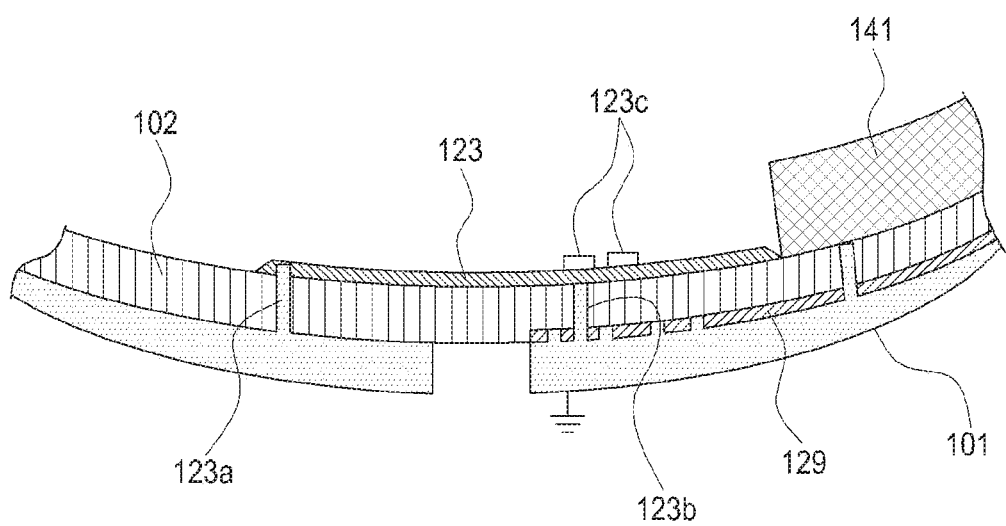
FIG. 11 is a cross-sectional view for describing a feeding configuration that is provided to a main body or an antenna of an electronic device according to one of various embodiments of the present invention.

Referring to FIG. 2, the electronic device 20 may include, for example, the entirety or a portion of the electronic device 1 illustrated in FIG. 11. The electronic device 20 may include at least one processor (e.g., Application Processor (AP)) 21, a communication module 22, a subscriber identification module 22g, a memory 23, a sensor module 24, an input device 25, a display 26, an interface 27, an audio module 28, a camera module 29a, a power management module 29d, a battery 29e, an indicator 29b, and a motor 29c.

The processor 21 may drive, for example, an operating system or an application program so as to control a plurality of hardware or software components connected thereto, and may also perform various data processing and arithmetic operations. The processor 21 may be implemented by, for example, a System-on-Chip (SoC). According to one embodiment, the processor 21 may further include a Graphic Processing Unit (GPU) and/or an image signal processor. The processor 21 may include at least some components (e.g., the cellular module 22a) among the components illustrated in FIG. 2. The processor 21 may load a command or data received from at least one of the other components (e.g., a non-volatile memory) in a volatile memory to process the command and data, and may store various data in a non-volatile memory.

The communication module 22 may have a configuration that is the same as, or similar to, the communication interface 11g of FIG. 1. The communication module 22 may include, for example, a cellular module 22a, a WiFi module 22b, a Bluetooth module 22c, a GNSS module 22d (e.g., a GPS module, a Glonass module, a Beidou module, or a Galileo module), an NFC module 22e, and a Radio Frequency (RF) module 22f.

The cellular module 22a may provide, for example, a voice call, a video call, a message service, or an internet service through, for example, a communication network. According to one embodiment, the cellular module 22a may perform discrimination and authentication of the electronic device 20 within the communication network by using the subscriber identification module (e.g., a SIM card) 22g. According to one embodiment, the cellular module 22a may perform at least some of the functions that may be provided by the processor 21. According to one embodiment, the cellular module 22a may include a Communication Processor (CP).

Each of the WiFi module 22b, the Bluetooth module 22c, the GNSS module 22d, and the NFC module 22e may include, for example, a processor to process data transmitted/received through a corresponding module. According to a certain embodiment, at least some (e.g., two or more) of the cellular module 22a, the WiFi module 22b, the Bluetooth module 22c, the GNSS module 22d, and the NFC module 22e may be incorporated in a single Integrated Chip (IC) or an IC package.

The RF module 22f may transmit/receive, for example, a communication signal (e.g., an RF signal). The RF module 22f may include, for example, a transceiver, a Power Amp Module (PAM), a frequency filter, a Low Noise Amplifier (LNA), or an antenna. According to another embodiment, at least one of the cellular module 22a, the WiFi module 22b, the Bluetooth module 22c, the GNSS module 22d, and the NFC module 22e may transmit/receive an RF signal through one or more separate RF modules.

The subscriber identification module 22g may include, for example, a card that includes a subscriber identification module and/or an embedded SIM, and may also include intrinsic identification information (e.g., Integrated Circuit Card IDentifier (ICCID)) or subscriber information (e.g., International Mobile Subscriber Identity (IMSI)).

The memory 23 (e.g., memory 11c) may include, for example, an internal memory 23a or an external memory 23b. The internal memory 23a may include at least one of, for example, a volatile memory (e.g., a Dynamic RAM (DRAM), a Static RAM (SRAM), or a Synchronous DRAM (SDRAM)), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard drive, or a Solid State Drive (SSD)).

The external memory 23b may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 23b may be functionally and/or physically connected to the electronic device 20 through various interfaces.

For example, the sensor module 24 may measure a physical quantity or may sense an operating status of the electronic device 20, and may then convert the measured or sensed information into electric signals. The sensor module 24 may include at least one of, for example, a gesture sensor 24a, a gyro sensor 24b, an atmospheric pressure sensor 24c, a magnetic sensor 24d, an acceleration sensor 24e, a grip sensor 24f, a proximity sensor 24g, a color sensor 24h (e.g., RGB (Red, Green, Blue) sensor), a biometric sensor 24i, a temperature/humidity sensor 24j, an illuminance sensor 24k, and a Ultra-Violet (UV) sensor 24l. Additionally or alternatively, the sensor module 24 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 24 may further include a control circuit for controlling one or more sensors incorporated therein. In a certain embodiment, the electronic device 20 may further include a processor configured to control the sensor module 24 as a part of the processor 21 or separate from the processor 21 so as to control the sensor module 24 while the processor 21 is in the sleep state.

The input device 25 may include, for example, a touch panel 25a, a (digital) pen sensor 25b, a key 25c, or an ultrasonic input device 25d. As the touch panel 25a, at least one of, for example, a capacitive type touch panel, a resistive type touch panel, an infrared type touch panel, and an ultrasonic type panel may be used. In addition, the touch panel 25a may further include a control circuit. The touch panel 25a may further include a tactile layer so as to provide a tactile reaction to a user.

The (digital) pen sensor 25b may be, for example, a portion of the touch panel or may include a separate recognition sheet. The key 25c may include, for example, a physical button, an optical key, or a keypad. The ultrasonic input device 25d may sense, through a microphone (e.g., a microphone 28d), ultrasonic waves that are generated by an input tool so as to confirm data corresponding to the sensed ultrasonic waves.

The display 26 (e.g., the display 11f) may include a panel 26a, a hologram device 26b, or a projector 26c. The panel 26a may include a configuration that is the same as or similar to that of the display 11f of FIG. 1. The panel 26a may be implemented to be flexible, transparent, or wearable. The panel 26a may be configured as a single module with the touch panel 25a. The hologram device 26b may show a stereoscopic image in the air using interference of light. The projector 26c may project light onto a screen so as to display an image. The screen may be located, for example, inside or outside the electronic device 20. According to one embodiment, the display 26 may further include a control circuit to control the panel 26a, the hologram device 26b, or the projector 26c.

The interface 27 may include, for example, a High-Definition Multimedia Interface (HDMI) 27a, a Universal Serial Bus (USB) 27b, an optical interface 27c, or a D-sub-miniature (D-sub) 27d. For example, the interface 27 may be included in the communication interface 11g illustrated in FIG. 1. Additionally or alternatively, the interface 27 may include, for example, a Mobile High-definition Link (MHL) interface, a Secure Digital (SD) card/Multi-Media Card (MMC) interface, or an Infrared Data Association (IrDA) standard interface.

The audio module 28 may bi-directionally convert, for example, sound and electric signals. At least some of the components of the audio module 28 may be included in, for example, the input/output interface 11e illustrated in FIG. 1. The audio module 28 may process sound information input or output through, for example, a speaker 28a, a receiver 28b, an earphone 28c, or a microphone 28d.

The camera module 29a is a device that is capable of photographing, for example, a still image and a moving image. According to one embodiment, the camera module 29a may include one or more image sensors (e.g., a front sensor or a rear sensor), a lens, an Image Signal Processor (ISP), or a flash (e.g., LED or xenon lamp).

The power management module 29d may manage, for example, the electric power of the electronic device 20. According to one embodiment, the power management module 29d may include a Power Management Integrated Circuit (PMIC), a charger Integrated Circuit (IC), or a battery or fuel gauge. The PMIC may be configured as a wired and/or wireless charge type. The wireless charging type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 29e, and a voltage, a current, or a temperature during the charge. The battery 29e may include, for example, a rechargeable battery and/or a solar battery.

The indicator 29b may indicate a specific status of the electronic device 20 or of a part thereof (e.g., the processor 21), such as a booting status, a message status, or a charged status. The motor 29c may convert an electric signal into a mechanical vibration, and may generate, for example, a vibration or a haptic effect. Although not illustrated, the electronic device 20 may include a processor (e.g., a GPU) to support a mobile TV. The processor to support a mobile TV may process media data according to the standards of, for example, Digital Multimedia Broadcasting (DMB), Digital Video Broadcasting (DVB), or MediaFlo™.

Each of the above-described component elements of hardware according to the present invention may be configured with one or more components, and the names of the corresponding component elements may vary based on the type of electronic device. The electronic device according to various embodiments of the present invention may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present invention may be implemented by a command stored in a computer-readable storage medium in a programming module form. The instruction, when executed by a processor (e.g., the processor 11), may cause the one or more processors to execute the function corresponding to the instruction. The computer-readable storage medium may be, for example, the memory 11.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

Figure 3:
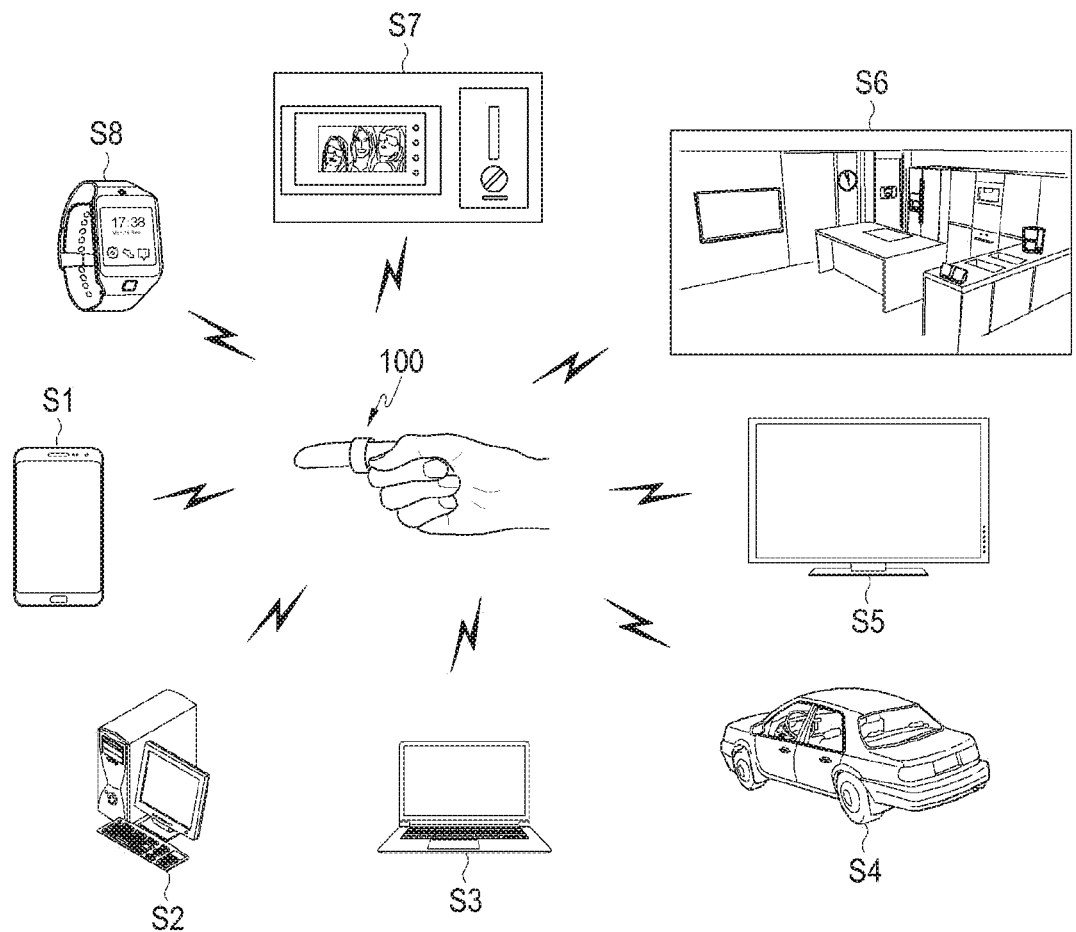
FIG. 3 is a view for describing use examples of an electronic device according to various embodiments of the present invention.

FIG. 3 is a view for describing use examples of an electronic device 100 (e.g., the above-mentioned electronic device 11, 12, 13, or 20) according to various embodiments of the present invention.

Referring to FIG. 3, the electronic device 100 may be a ring-type electronic device that is wearable on a body (e.g., a finger), and may perform wireless communication with other electronic devices through Bluetooth, a wireless LAN, a commercially available communication network, or the like. For example, the electronic device 100 may perform wireless communication with other electronic devices, such as a smart phone S1, desk top/lap top computers S2 and S3, an automobile S4, a smart TV S5, interior smart home devices S6, a tablet PC S7, and a smart watch S8. The wireless communication between the electronic device 100 and the other electronic devices may be implemented by device-to-device wireless communication through a standard, such as Bluetooth or wireless communication that is performed via other networks, such as a commercially available network. For example, when a Bluetooth communication link is established between the electronic device 100 and an electronic device that is to be connected by the user, transmission of a message or the like may be enabled between the two electronic devices, and the electronic device 100 worn by the user may generate commands that respectively correspond to specific motions/gestures of the user's fingers, and may transmit the commands to the other electronic devices. In order to detect motions/gestures or the like of the user's fingers, the electronic device 100 may be provided with motion sensors (e.g., an accelerometer, a gyroscope, and an electronic compass). When a message or the like is received to the electronic device 100 from any other electronic device, the electronic device 100 may notify the user of the message reception using sound, vibration, or lighting. For this purpose, the electronic device 100 may be provided with a sound module, a vibration module, a lighting device, and so on.

The above-described configuration of an electronic device will be described in more detail with reference to FIGS. 4 and 5.

Figure 4:
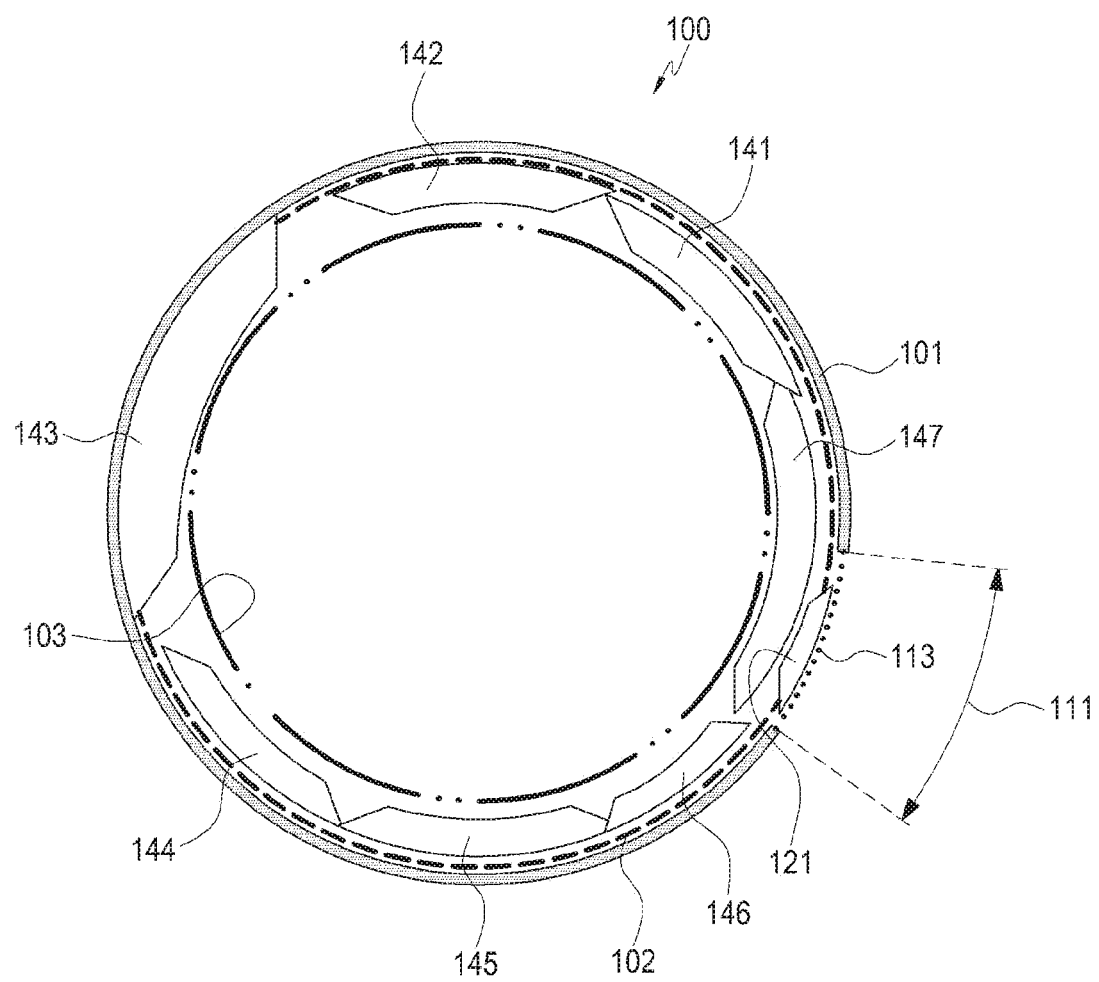
FIG. 4 is a cross-sectional view illustrating a configuration of an electronic device according to one of various embodiments of the present invention.

FIG. 4 is a cross-sectional view illustrating a configuration of an electronic device 100 according to one of various embodiments of the present invention. FIG. 5 is a cross-sectional view illustrating a configuration of an electronic device 200 according to another one of various embodiments of the present invention.

Figure 5:
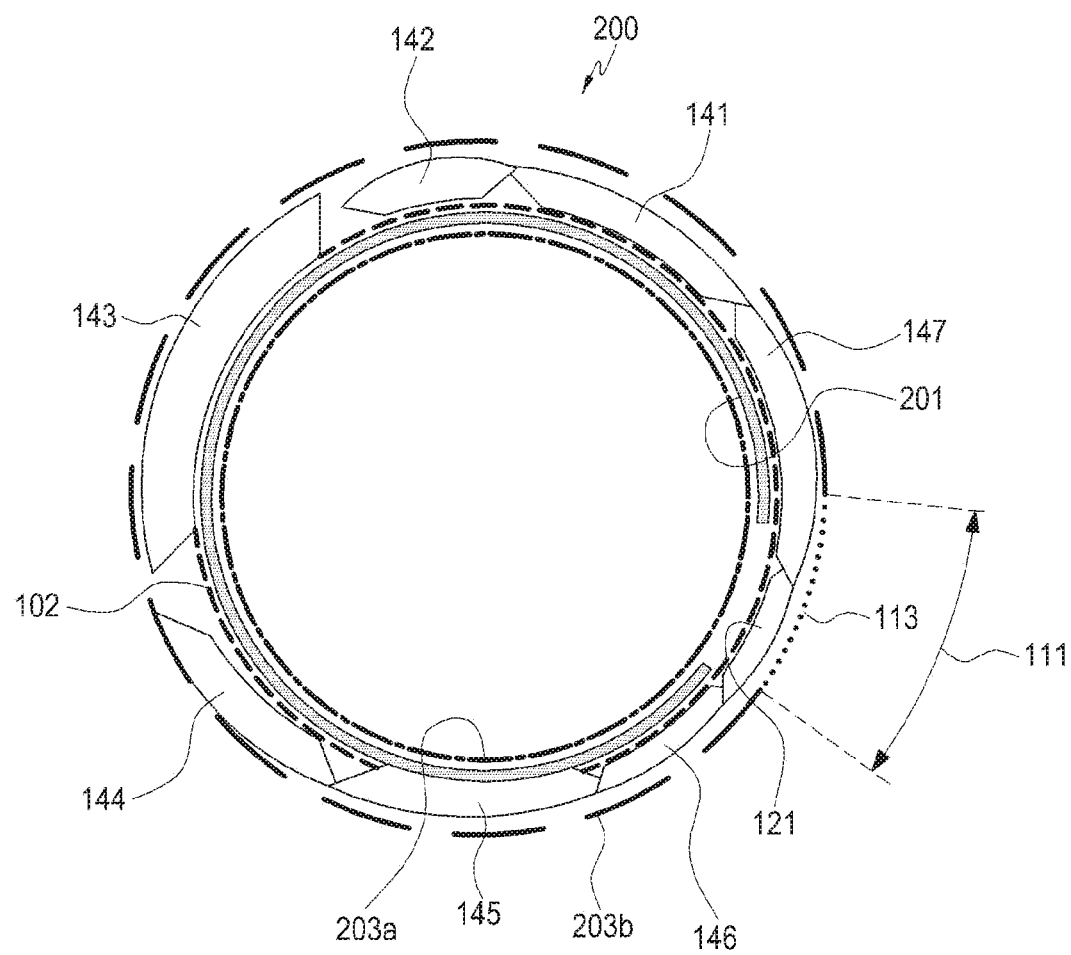
FIG. 5 is a cross-sectional view illustrating a configuration of an electronic device according to another one of various embodiments of the present invention.

Referring to FIGS. 4 and 5, the electronic devices 100 and 200 may have a ring shape to be wearable on a user's body (e.g., a finger). Each of the electronic devices 100 and 200 may include a communication module 141, a processor (e.g., a micro controller module (MCU)) 142, a battery 143, a charging/discharging integrated circuit (e.g., a power management module) 144, a motion sensing sensor module 145, which includes a gyroscope, an accelerometer, and/or an electronic compass, an input/output module 146, which includes a vibration module and/or a sound module, a feeding/matching module 147, and so on, which are arranged on inner or outer surface of the main body 101 or 201 of each of the electronic devices 100 and 200. Each main body 101 or 201 may include opposite ends that extend in a curved form to be adjacent to each other such that the main body takes a loop shape or a ring shape, and one or more of the electronic components listed above may be arranged in a circumferential direction on the inner or outer surface of the main body 101 or 201.

The main body 101 or 201 may be made of a conductive material (e.g., a stainless steel, aluminum, or titanium), and the opposite ends of the main body 101 or 201 may extend in a curved form to be adjacent to each other such that the main body 101 or 201 takes a loop shape. According to various embodiments, the main body 101 or 201 may take a ring shape, and a narrow gap 111 may be formed between the opposite ends of the main body 101 or 201. When the main body 101 or 201 is formed in the ring shape, the user may wear the electronic device 100 or 200 on a finger or the like. Each main body 101 or 201 may be made of a conductive material, and may be utilized as an antenna (e.g., a radiating conductor) by being fed with a power from the communication module 141. In the narrow gap 111 formed between the opposite ends of the main body 101 or 201, a switch element or a light emission element may be disposed to form a portion (hereinafter, referred to as a "first input/output module 121") of an input/output device (or an input/output module). A cover member 113 may be mounted on the first input/output module 121. The cover member 113 may form a portion of an insulator layer 103, or 203a and 203b that is provided on the inner or outer surface of the main body 101 or 201. When a light emission element is provided in the first input/output module 121, the cover member 113 may be made of a transparent or translucent material so as to emit the light generated from the light emission element to the outside.

The processor 142 may be implemented as, for example, a micro controller module. The processor 142 may drive an operation system or an application program so as to control hardware or software components disposed inside the electronic device 100 or 200, and may also perform various data processing and arithmetic operations. The battery 143 may be implemented to be charged in a wired or wireless manner, and may supply a power to various electronic components inside the electronic device 100 or 200. The charging/discharging integrated circuit 144 is, for example, a power management module of the electronic device 100 or 200, and may output data related to a charging state while monitoring the charging/discharging state of the battery 143 or the like. Based on the data provided from the charging/discharging integrated circuit 144, the processor 142 may output charging state information or the like via a vibration module, a sound module, or a light emission element.

The communication module 141 may transmit/receive a wireless signal by providing a feeding signal to a radiating conductor (e.g., the main body 101 or 201). The communication module 141 may include a low energy Bluetooth module of which the power consumption is low. The electronic device 100 or 200 may be connected to other electronic devices or a network (e.g., the above-described network environment 10) through the communication module 141 and an antenna (e.g., the main body 101 or 201).

The motion sensing sensor module 145 may include a gyroscope, an accelerometer, an electronic compass, and so on, and may generate an input signal according to a motion of the user's finger. For example, information related to the user's moving direction, speed, and so on detected from the gyroscope, the accelerometer, and the electronic compass may be transmitted to the processor 142, and the processor 142 may generate various input signals or output signals on the basis of the information provided from the motion sensing sensor module 145.

The electronic device 100 or 200 may further include a second input/output module 146 that includes a vibration module or a sound module, in addition to the first input/output module 121 that includes the above-described switch element or light emission element. For example, the second input/output module 146 in which a vibration module and a sound module are incorporated may be disposed on the main body 101 or 201. The second input/output module 146 may output vibration or sound according to a signal generated by the processor 142 on the basis of various pieces of collected information (e.g., a received message, or the user's moving direction or speed).

The feeding/matching module 147 may include a feeding line provided between the communication module 141 and the radiating conductor (e.g., the main body 101 or 201) and at least one of the matching elements disposed on the feeding line. The feeding/matching module 147 may provide a feeding signal from the communication module 141 to the main body 101 or 201, and may stabilize the transmission performance of an antenna by the matching circuit that is constituted with a capacitive element, an inductive element, a resistive element, or the like.

The electronic device 100 or 200 may include a printed circuit board 102 in order to interconnect the above-described electronic components (e.g., the communication module 141, the processor 142, and the battery 143). The printed circuit board 102 may be implemented using, for example, a Flexible Printed Circuit Board (FPCB). According to various embodiments, the printed circuit board 102 may be implemented as a board in which a plurality of segments are connected. The printed circuit board 102 may extend along the circumferential direction on the inner or outer surface of the main body 101 or 201, and may be alternately interposed between the electronic components and the main body 101 and 201. The printed circuit board 102 may have a structure in which a plurality of conductive layers and dielectric layers are alternately stacked, and a ground layer may be provided on one face of the printed circuit board 102. The ground layer may come in contact with the main body 101 or 201 directly or indirectly, and a structure related to this will be described in more detail below with reference to FIG. 11.

As illustrated in FIGS. 4 and 5, at least one of the above-described electronic components (e.g., the communication module 141, the processor 142, and the battery 143) may be disposed on the inner or outer surface of the main body 101 or 201. When the electronic device 100 or 200 includes the insulator layer(s) 103 or 203a and 203b, it is possible to prevent the main body 101 or 201 or the electronic components from being directly in contact with the user's body, and may conceal the electronic components.

For example, referring to FIG. 4, the above-described electronic components may be arranged along the circumferential direction on the inner surface of the main body 101, and the insulator layer 103 may be formed on the inner surface of the main body 101 to conceal the electronic components. According to various embodiments, the insulator layer 103 may be provided to be exchangeable by the user depending on the size of the wearing portion in wearing the electronic device 100 on the user's body. For example, the user may select or purchase the insulator layer in a proper size, and may wear the electronic device 100 by coupling the selected insulator layer to the main body 101.

Referring to FIG. 5, the above-described electronic components may be arranged along the circumferential direction on the outer surface of the main body 201, and a first insulator layer 203a may be disposed on the inner surface of the main body 201. A second insulator layer 203b may be disposed on the outer surface of the main body 201 to conceal the above-described electronic components. The main body 201 may be utilized as an antenna (e.g., a radiating conductor), and the first insulator layer 203a may block the user's body from being directly in contact with the main body 201. For example, the first insulator layer 203a may insulate the main body 201 and the user's body from each other. Similar to the preceding embodiment, the first insulator layer 203a may be provided in a structure to be exchangeable by the user, so that the user may select or purchase the first insulator layer in a desired size in consideration of the wearing portion and may couple the first insulator layer. The second insulator layer 203b is positioned on the outer surface of the main body 201, and may have various shapes or patterns in order to make the external appearance of the electronic device 200 beautiful.

Hereinafter, more various embodiments of the electronic devices 100 and 200 will be described with reference to FIG. 6 or the like.

Figure 6:
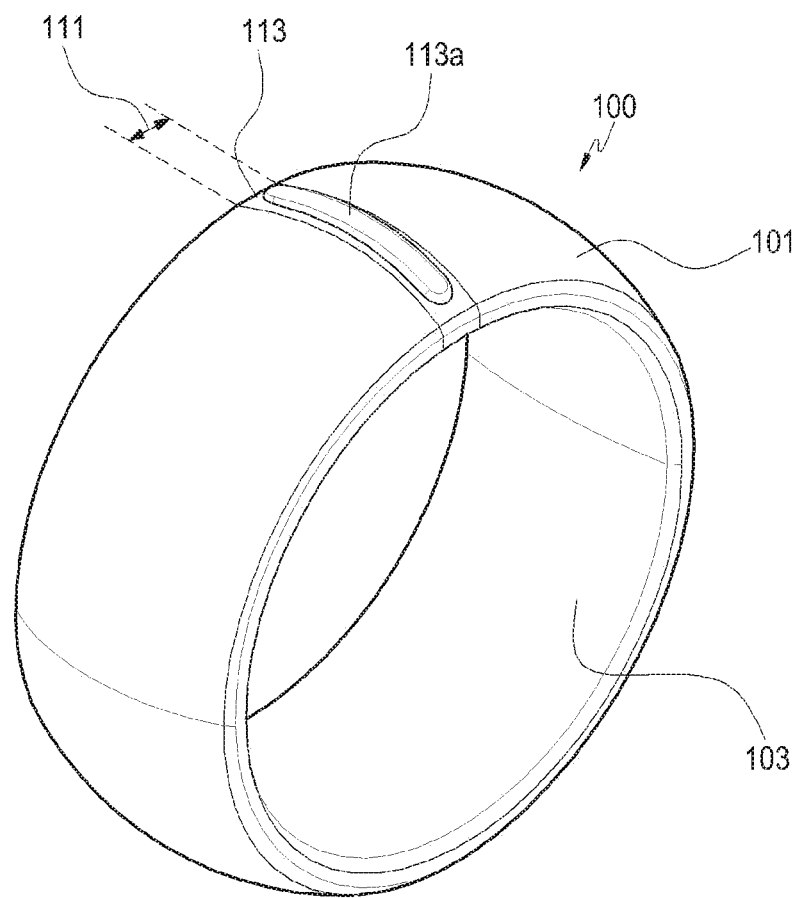
FIG. 6 is a perspective view illustrating an electronic device according to one of various embodiments of the present invention.
Figure 7:
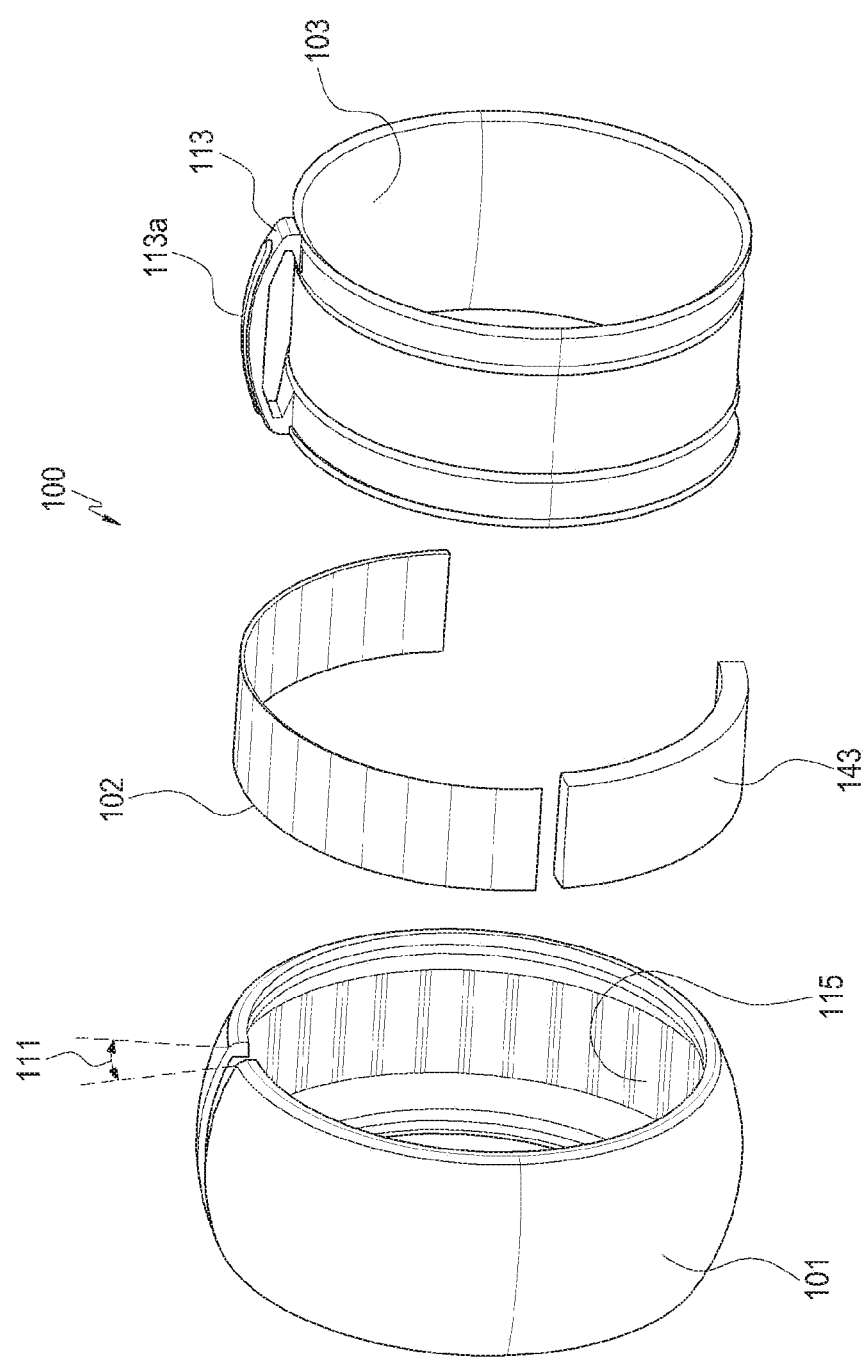
FIG. 7 is an exploded perspective view illustrating an electronic device according to one of various embodiments of the present invention.
Figure 8:
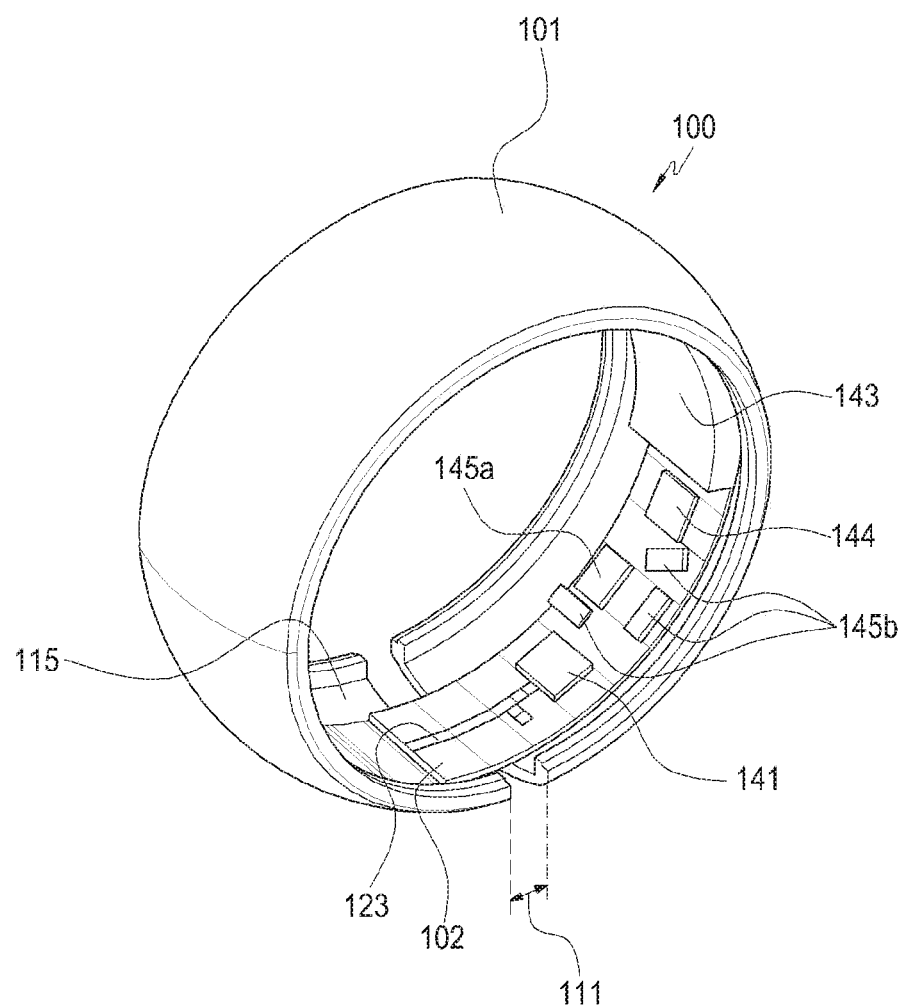
FIG. 8 is a perspective view for describing a configuration of a portion of an electronic device according to one of various embodiments of the present invention.
Figure 9:
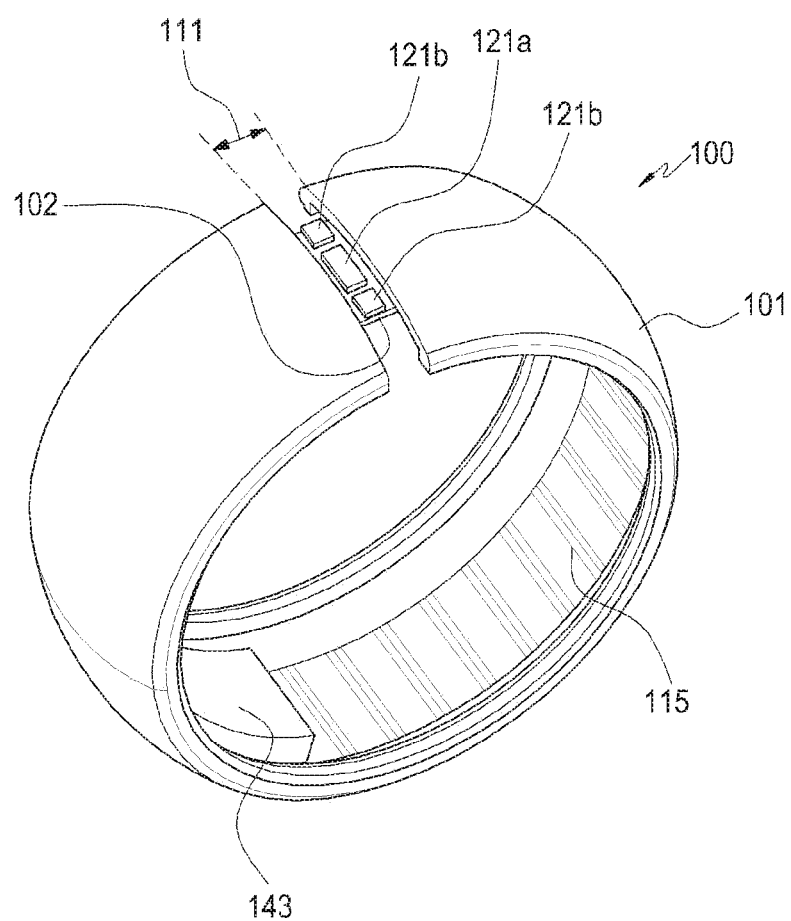
FIG. 9 is a perspective view for describing a configuration of another portion of an electronic device according to one of various embodiments of the present invention.

FIG. 6 is a perspective view illustrating the electronic device 100 according to one of various embodiments of the present invention. FIG. 7 is an exploded perspective view illustrating the electronic device 100 according to one of various embodiments of the present invention. FIG. 8 is a view for describing a configuration of a portion of the electronic device 100 according to one of various embodiments of the present invention. FIG. 9 is a view for describing a configuration of another portion of the electronic device 100 according to one of various embodiments of the present invention.

Referring to FIGS. 6 to 9, the electronic device 100 may include a main body 101, a printed circuit board 102, an insulator layer 103, and electronic components including a battery 143.

The main body 101 may extend in a curved form of a ring shape such that the opposite ends thereof may be located to be adjacent to each other, thereby forming a narrow gap 111. On the inner surface of the main body 101, a recess 115 may be formed so as to accommodate the printed circuit board 102 or the electronic components therein. The insulator layer 103 is coupled to the inner surface of the main body 101 to conceal and protect the printed circuit board 102 and the electronic components that are disposed on the inner surface of the main body 101. A cover member 113 may be disposed on the narrow gap 111, and the cover member 113 may have a shape corresponding to the sectional shape of the main body while extending from the insulator layer 103. For example, the cover member 113 may be disposed on the narrow gap 111 and may form the outer circumferential face of the electronic device 100 while forming a closed loop shape together with the main body 101. The cover member 113 may be integrally formed with the insulator layer 103.

The printed circuit board 102 is configured to dispose various electronic components of the electronic device 100 thereon so as to interconnect the electronic components, and may be disposed in the recess 115 formed on the inner surface of the main body 101. The above-mentioned battery 143 may also be connected to the printed circuit board 102, and may be disposed in the recess 115 together with the printed circuit board 102 along the circumferential direction.

On the printed circuit board 102, the above-mentioned electronic components may be mounted, including the communication module 141, the processor 142, the charging/discharging integrated circuit 144, a motion sensing sensor modules 145a and 145b (e.g., a gyroscope, an accelerometer, and an electronic compass), the input/output module including a vibration module and/or a sound module, and the feeding/matching module. The motion sensing sensor modules 145a and 145b may be provided with a plurality of accelerometers. The plurality of accelerometers may be arranged to be inclined in relation to each other so as to detect a motion in different directions, respectively. For example, three accelerometers may be arranged to be inclined at an angle of 45 degrees in relation to each other so as to detect a motion in different directions, respectively.

According to various embodiments, one or more pairs of the above-described electronic components may be incorporated in the form of a single integrated circuit chip. For example, the processor may be integrated in the communication module 141. The printed circuit board 102 may be disposed on the inner surface of the main body 101, and may extend across the narrow gap 111. The above-described switch element 121a and the light emission element 121b may be disposed on the outer surface of the printed circuit board 102. For example, the above-described switch element 121a and the light emission element 121b may be disposed on the outer surface of the printed circuit board 102, and may be positioned within the narrow gap 111.

On the narrow gap 111, the cover member 113 may be disposed to conceal and protect the switch element 121a and the light emission element 121b. As described above, the cover member 113 may be made of a transparent or translucent material so as to emit the light emitted from the light emission element 121b. In addition, in order to allow the user to operate the switch element 121a, an operating portion 113a may be provided on the cover member 113. The operating portion 113a is formed by a portion protruding from the outer surface of the cover member 113, and may transfer a pressure applied by the user so as to operate the switch member 121a.

The feeding/matching module of the electronic device 100 may be provided on the printed circuit board 102. For example, the above-mentioned feeding/matching module may be provided in one of the conductive layers of the printed circuit board 102. The configuration of the above-mentioned feeding/matching module will be further described with reference to FIGS. 10 and 11.

Figure 10:
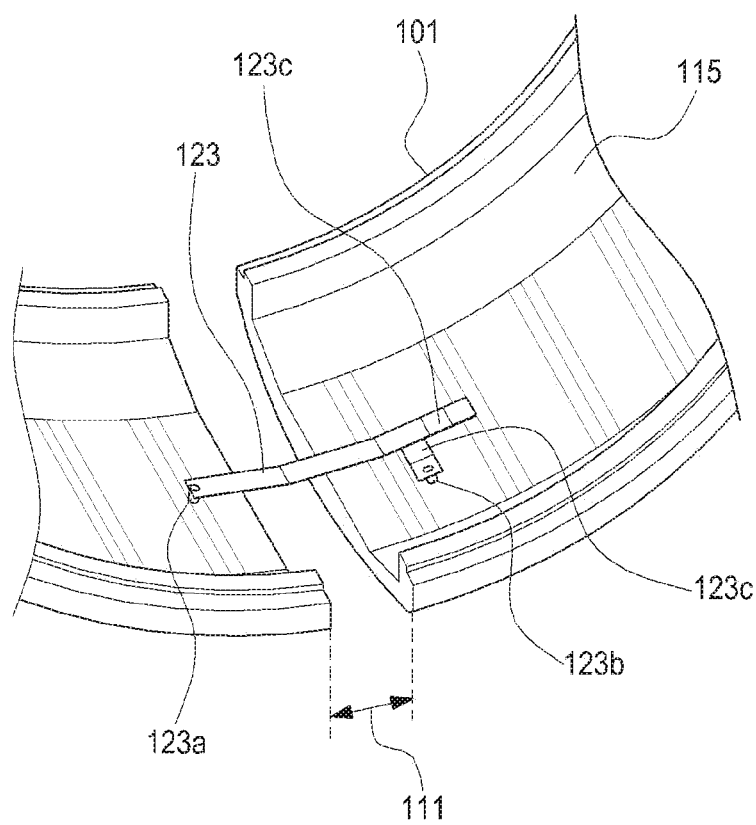
FIG. 10 is a view for describing a feeding configuration that is provided to a main body or an antenna of an electronic device according to one of various embodiments of the present invention.

FIG. 10 is a view for describing a feeding configuration that is provided to the main body 101 or an antenna of the electronic device 100 according to one of various embodiments of the present invention. FIG. 11 is a sectional view for describing a feeding configuration that is provided to the main body 101 or an antenna of the electronic device 100 according to one of various embodiments of the present invention.

Referring to FIGS. 10 and 11, the above-mentioned feeding/matching module may include a feeding line 123 and matching elements 123c provided on the feeding line 123. The feeding line 123 may extend from the communication module 141 to a side of the narrow gap 111 across the narrow gap 111. The printed circuit board 102 may include a connection terminal 123a that connects the feeding line 123 to the main body 101. The connection terminal 123a may be formed as a via hole formed in the printed circuit board 102 or a shorting pin disposed through the printed circuit board 102. The connection terminal 123a may connect the feeding line 123 to the main body 101 at one side of the narrow gap 111. Thereby, the main body 101 may receive a feeding signal from the communication module 141. According to various embodiments, another connection terminal 123b is provided at the other side of the narrow gap 111 so as to connect the feeding line 123 to the main body 101. The printed circuit board 102 may be provided with a ground layer 129 in a region that corresponds to the other side of the narrow gap 111. The ground layer 129 is disposed to be directly in contact with the inner surface of the main body 101, and the connection terminal 123b disposed at the other side of the narrow gap 111 may be connected with the ground layer 129. The matching elements 123c may include a capacitive element, an inductive element, or a resistive element. The matching elements 123c may configure a matching circuit by one of the capacitive element, the inductive element, and the resistive element, or a combination of two or more of the capacitive element, the inductive element, and the resistive element. The matching circuit may be used for impedance matching of a feeding signal supplied to the main body 101, or for setting a resonance frequency of a wireless signal transmitted/received through the main body 101. For example, the matching elements 123c may be used for stabilizing the transmission/reception function of a wireless signal in using the main body 101 as an antenna.

Figure 12:
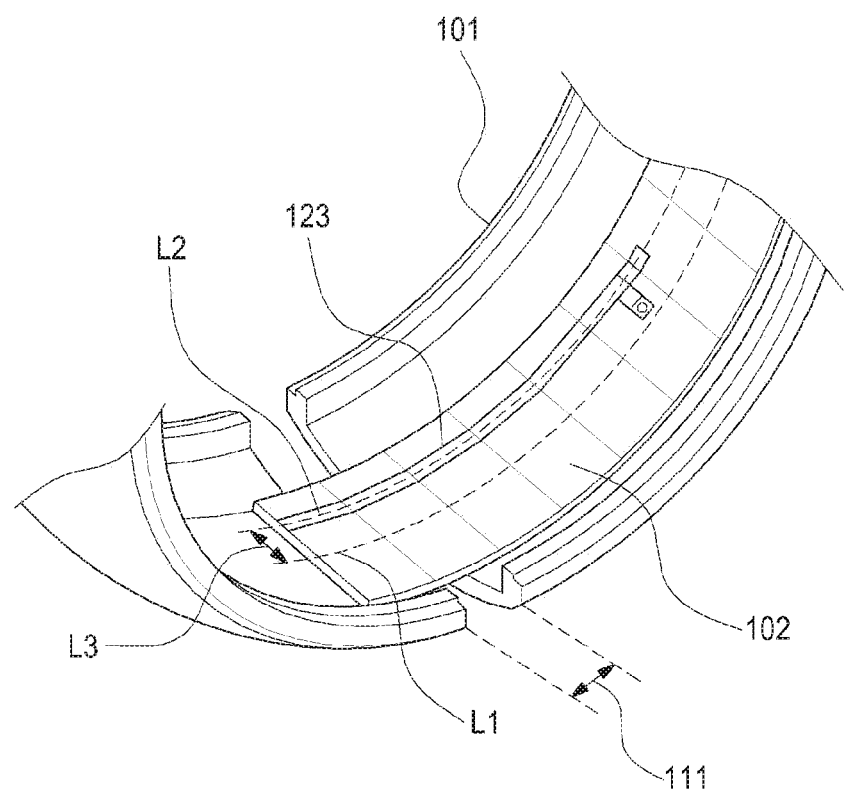
FIGS. 12 and 13 are views for describing modification examples of a feeding structure in an electronic device according to one of various embodiments of the present invention.
Figure 13:
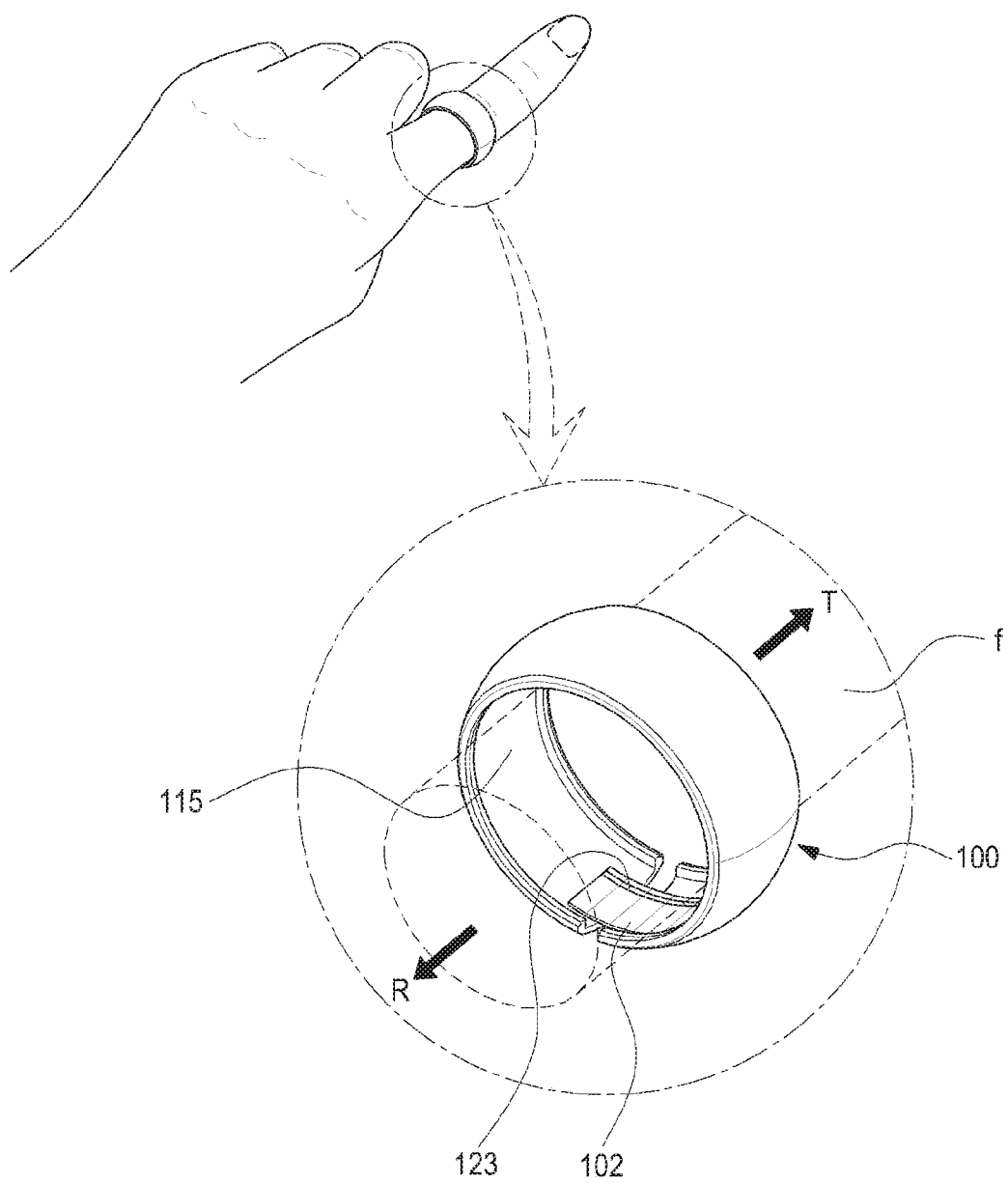

FIGS. 12 and 13 are views for describing modification examples of a feeding structure in the electronic device 100 according to one of various embodiments of the present invention.

Referring to FIGS. 12 and 13, a position L2 where the feeding line 123 is disposed may be located on the inner surface of the main body 101 to be deviated from the center L1 of the main body 101 by a predetermined distance L3. For example, the feeding line 123 may extend along the extension direction of the main body 101 to be in parallel with the extension direction while being adjacent to one of the opposite sides of the main body 101. In the structure described above, when the electronic device 100 is worn on a body, the feeding line 123 may be disposed closer to one side of the main body in a direction T that faces a tip end of a finger f than a direction R that faces the user's body (e.g., a hand). Through the state of the feeding line 123 disposed and worn as described above, an influence of the user's body may be somewhat ameliorated in performing wireless communication. For example, the wireless transmission/reception function through the main body may be improved, which may reduce power consumption in using the battery. In addition, as the feeding line 123 is disposed closer to the one side of the main body 101 than the other side of the main body 101, which may further facilitate disposing the switch element 121a at the center of the main body 101. For example, the feeding line 123 and the switch element 121a are arranged to be deviated from each other so that an interference therebetween may be avoided.

Figure 14:
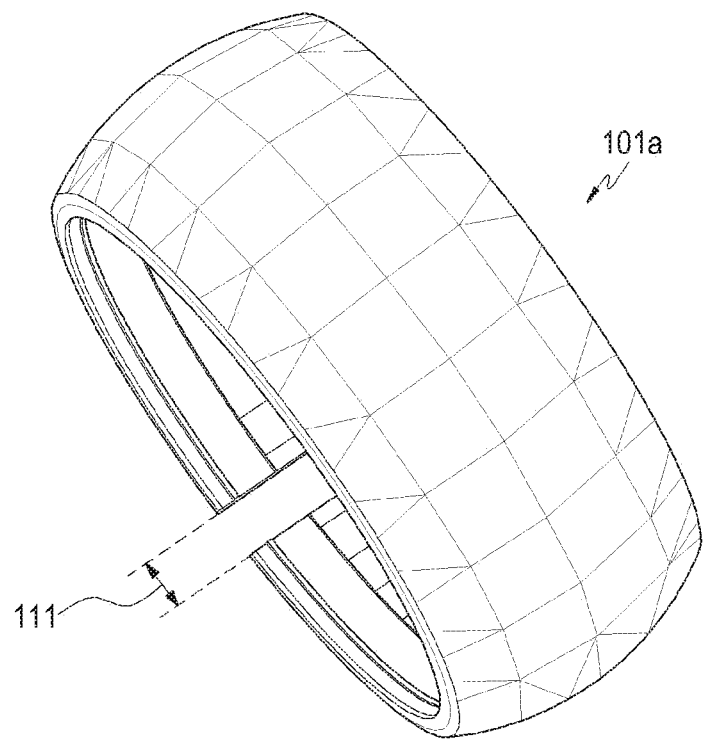
FIG. 14 is a perspective view illustrating an example of modifying the exterior of an electronic device according to one of various embodiments of the present invention.

FIG. 14 is a perspective view illustrating an example of modifying the exterior of the electronic device 100 according to one of various embodiments of the present invention.

Referring to FIG. 14, when the printed circuit board and various electronic components are disposed inside the main body 101, various patterns may be provided on the outer surface of the main body 101 so as to diversify the external appearance. For example, the outer surface of the main body 101 may have a shape in which a plurality of faceted surfaces are continued, and may be plated with gold, silver, platinum, or the like. By processing the outer surface of the main body 101 with plating, it is possible to improve the electric conductivity of the main body 101, which may contribute to the improvement of the transmission/reception performance of a wireless signal through the main body 101. In the specific embodiment of the present invention, a configuration has been exemplified in which the outer surface of the main body 101 is formed by connecting a plurality of faceted surfaces to each other, but the present invention is not limited thereto. For example, various shapes of patterns, decorations, or the like may be provided on the outer surface of the main body 101 so as to make the external appearance of the electronic device 100 beautiful.

Figure 15:
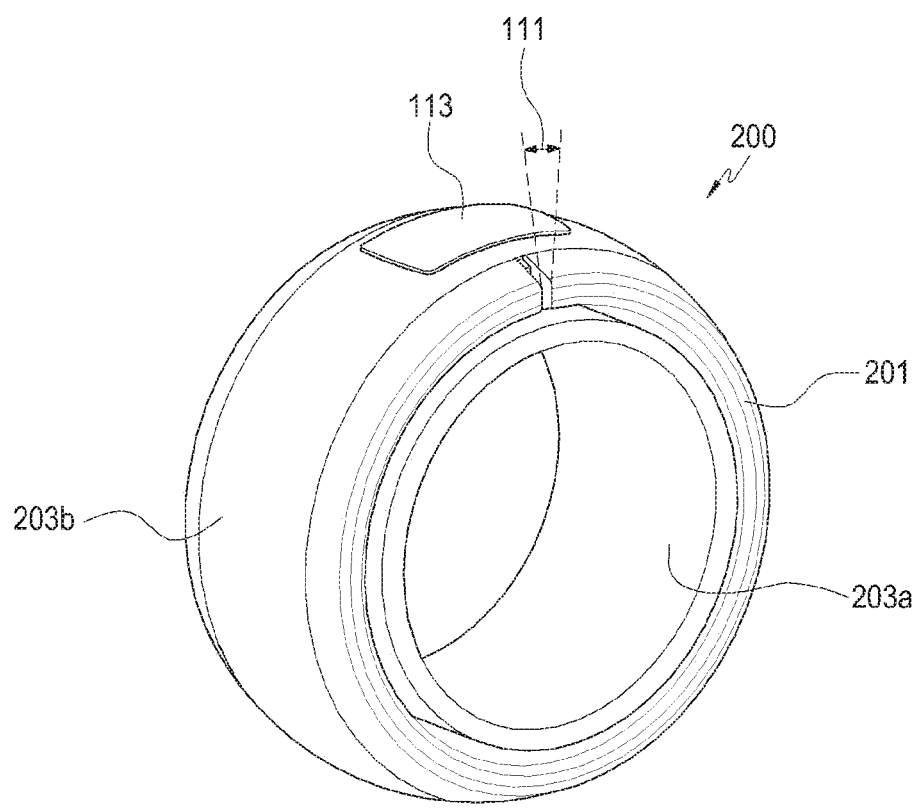
FIG. 15 is a perspective view illustrating an electronic device according to another one of various embodiments of the present invention.
Figure 16:
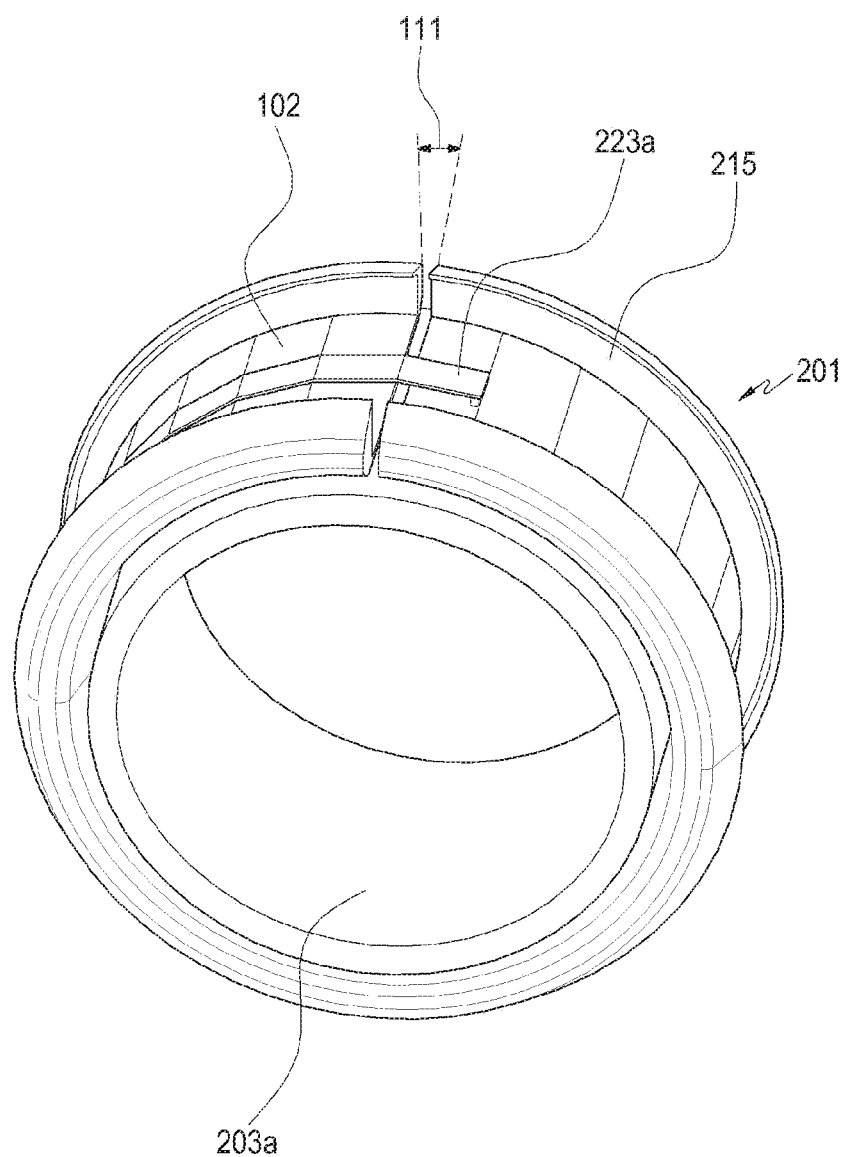
FIG. 16 is a perspective view illustrating an electronic device according to another one of various embodiments of the present invention after a portion of the electronic device is removed.
Figure 17:
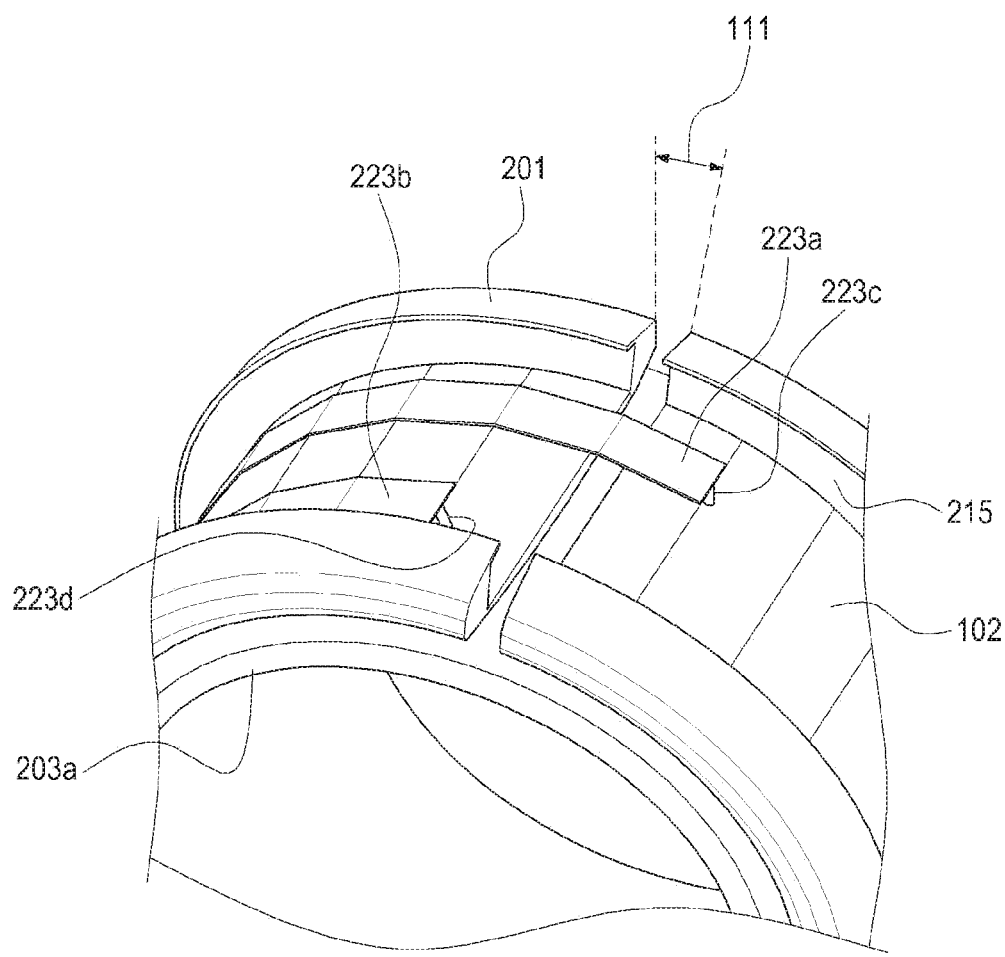
FIG. 17 is a perspective view illustrating an electronic device according to another one of various embodiments of the present invention in an enlarged scale after a portion of the electronic device is removed.

FIG. 15 is a perspective view illustrating an electronic device 200 according to another one of various embodiments of the present invention. FIG. 16 is a perspective view illustrating the electronic device 200 according to another one of various embodiments of the present invention after a portion of the electronic device 200 is removed. FIG. 17 is a perspective view illustrating the electronic device 200 according to another one of various embodiments of the present invention in an enlarged scale after a portion of the electronic device is removed.

Referring to FIGS. 15 to 17, the electronic device 200 includes a main body 201 that is made of a conductive material in which the opposite ends of the main body 201 are curved to be adjacent to each other so that the main body has a loop shape. The main body 201 includes a recess 215 formed on the outer surface thereof to be capable of accommodating a printed circuit board 102 and various electronic components mounted on the printed circuit board 102. A predetermined space (e.g., a narrow gap 111) may be formed between the opposite ends of the main body 201. According to various embodiments, the main body 201 may have a shape to be wearable on the user's body (e.g., a ring shape).

Various electronic components may be disposed in the recess 215 formed on the outer surface of the main body 201 together with the printed circuit board 102. Because the arrangement of the electronic components is similar to the arrangement described above with reference to FIGS. 5 and 6, it is noted that, hereinafter, the detailed descriptions thereof may be omitted or the descriptions of the configuration of the preceding embodiment will be referred to in describing the configuration of the present embodiment.

The electronic device 200 may include a first insulator layer 203a formed on the inner surface of the main body 201 and a second insulator layer 203b formed on the outer surface of the main body 201. The main body 201 may be used as an antenna (e.g., a radiating conductor) of the electronic device 200, and the first insulator layer 203a may prevent the main body 201 from being directly in contact with the user's body. For example, the user may wear the electronic device 200 on a portion of the body (e.g., a finger), and in the state of being worn on the body, the first insulator layer 203a comes in contact with the user's skin so as to prevent the main body 201 from being directly in contact with the user's skin.

The first insulator layer 203a may be implemented to be exchangeable by the user. For example, the user may select or purchase the first insulator layer that is suitable for the size of a body portion on which the electronic device 200 is to be worn, and may couple the first insulator layer to the main body 201. Accordingly, the user may feel a convenient wearing feeling in wearing and using the electronic device 200.

The second insulator layer 203b may be formed on the outer surface of the main body 201, and may conceal and protect the printed circuit board 102 and the electronic components that are accommodated and mounted in the recess 215. The second insulator layer 203b may provide various patterns or decorations on the external appearance of the electronic device 200. At least a portion of the second insulator layer 203b may include an operating portion 113 made of a transparent or translucent material. The operating portion 113 may protrude more than other outer surface portion of the second insulator layer 203b, and may be positioned to correspond to the switch element disposed on the printed circuit board 102. According to various embodiments, at least one light emission element may be mounted on the printed circuit board 102. As the second insulator layer 203b is made of a transparent or translucent material, the light emitted from the light emission element may be emitted to the outside through the second insulator layer 203b.

The preceding embodiment has exemplified a structure in which light emission elements 121b are disposed within the narrow gap 111. In the structure of the electronic device 200 of the present embodiment, the printed circuit board 102 may be disposed on the outer surface of the main body 201 so that the arrangement of the light emission elements may be designed more freely. For example, among the opposite faces of the printed circuit board, light emission elements may be freely disposed on the face of the printed circuit board 102, which faces the outer surface of the main body 201. However, a communication module, a processor, or the like may be disposed on the printed circuit board 102, and the positions or the like of the other electronic components may be considered in arranging the light emission elements.

The printed circuit board 102 may include a feeding line 223a that extends from the communication module to a side of the narrow gap 111 across the narrow gap 111. The feeding line 223a may provide a feeding signal to the main body 201 from the communication module. The printed circuit board 111 may include a connection terminal 123a that connects the feeding line to the main body 201. For example, the main body 201 may receive a feeding signal through the feeding line 223*a* and the connection terminal 223*c*.

According to various embodiments, the electronic device 200 may further include a second feeding line 223*b*. The second feeding line 223*b* may extend from the communication module to the other side of the narrow gap 111, without passing across the narrow gap 111. The second feeding line 223*b* may be connected to the main body 201 at the other side of the narrow gap 111 through the second connection terminal 223*d*. Thereby, the main body 201 may receive a differential ratio frequency signal from the communication module through the first and second feeding lines 223*a* and 223*b*.

Figure 18:
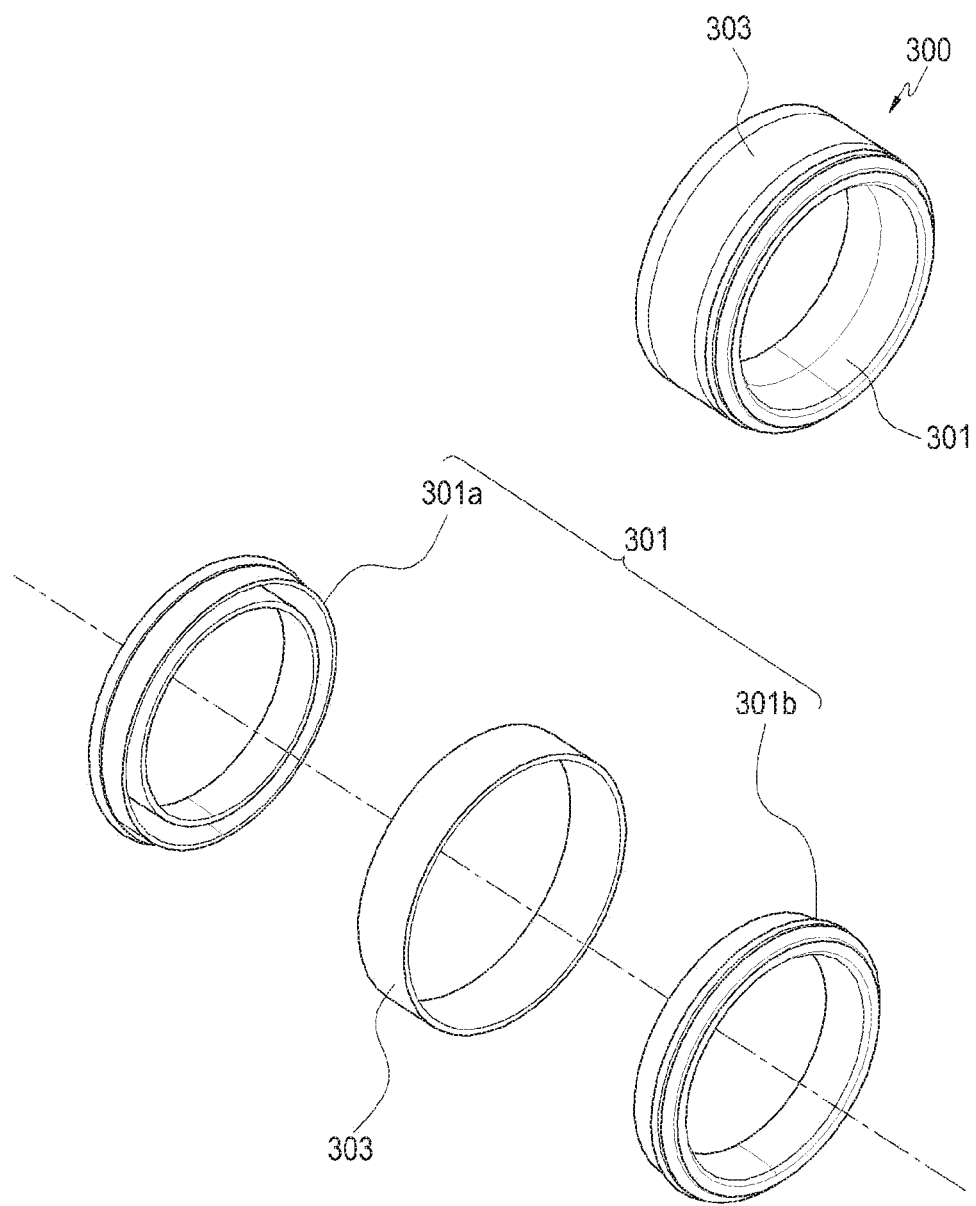
FIG. 18 is a perspective view illustrating an electronic device according to still another one of various embodiments of the present invention.

FIG. 18 is a perspective view illustrating the electronic device 300 according to still another one of various embodiments of the present invention.

The electronic device 300 according to the present embodiment is different from those of the preceding embodiments in that the main body 301 is implemented by two pieces or rings 301*a* and 301*b*. For example, the main body 301 may be completed by coupling the two rings 301*a* and 301*b* to each other, and the printed circuit board or the above-described electronic components may be completely accommodated within the main body 301. In the present embodiment, it is exemplified that the main body 301 has a closed loop shape, but similar to those of the preceding embodiments, the electronic device 300 may include a narrow gap and a feeding line extending across the narrow gap. In the state where the two rings 301*a* and 301*b* are coupled to each other, the main body 301 may include a recess that accommodates the printed circuit board or the electronic components. The recess may be formed on the inner or outer surface of the main body 301. On the inner surface and/or the outer surface of the main body 301, an insulator layer 303 may be provided to prevent the user's body from being directly in contact with the main body 301, or to conceal and protect the printed circuit board and the electronic components disposed on the main body 301. According to various embodiments, each of the rings, which form the main body 301, may be made of a conductive material, and may be used as an antenna by being fed with a power from the communication module. The rings 301*a* and 301*b* may be manufactured and exchanged to be suitable for an antenna specification that is required by the electronic device 300.

Figure 19:
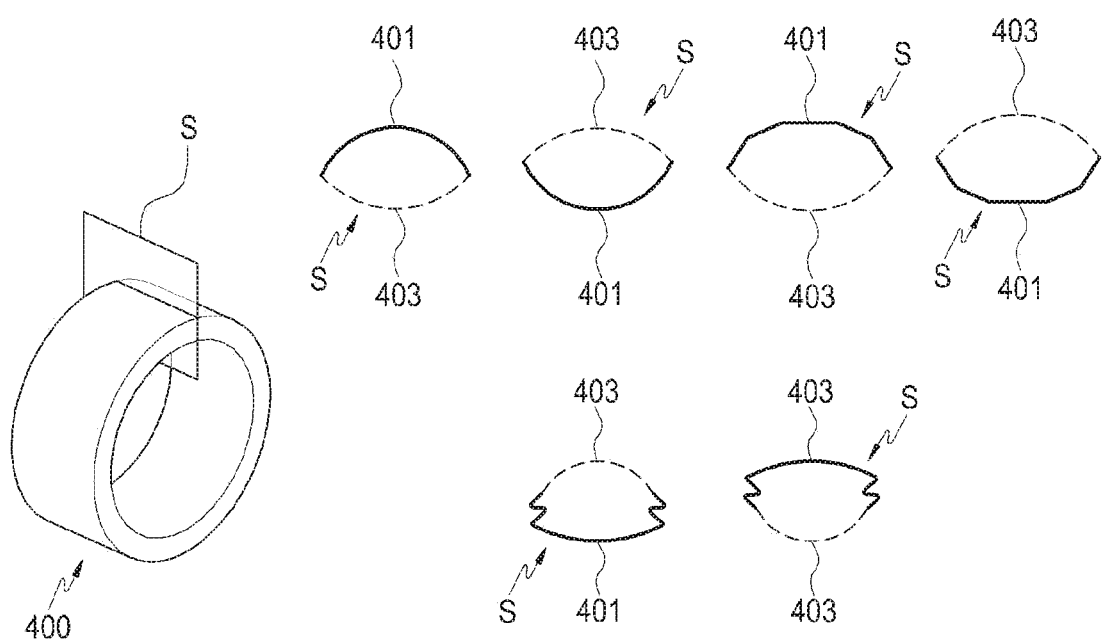
FIG. 19 is a view for describing sectional shapes of an electronic device according to various embodiments of the present invention.

FIG. 19 is a view for describing the shapes of the cross section S of an electronic device 400 according to various embodiments of the present invention.

Referring to FIG. 19, the cross section S of the electronic device 400 may be implemented in various shapes. For example, the cross section of the main body 401 may be implemented as: a shape in which a concave recess is formed on the inner surface (an outwardly convex shape); a shape in which a concave recess is formed on the outer surface (an inwardly convex shape); a shape in which the outer surface is formed by connecting a plurality of faceted surfaces while a concave recess is formed on the inner surface; a shape in which a curve or a pattern is formed on a side face of the main body 401 regardless of the position of the recess formed on the main body 401; and so on. In the embodiment illustrated in FIG. 19, shapes in which the outer surface of the electronic device 400 is convex as the insulator layer 403 is filled in the recess of the main body 401, but the insulator layer 403 may be implemented in various shapes similar to the cross section of the main body 401.

Through the above-described embodiments, it has been described that a printed circuit board or electronic components are disposed in a recess of a body (e.g., the above-mentioned body 101, 201, or 301). The printed circuit board or the like may also be disposed in a recess formed on the inner or outer surface of the main body 401, and the insulator layer 403 may be coupled to the main body 401 to provide a dirt-resistant function or a waterproof function. For example, the insulator layer 403 may prevent the printed circuit board or electronic components, which are disposed in the recess of the main body, from being polluted by foreign matter or moisture.

Figure 20:
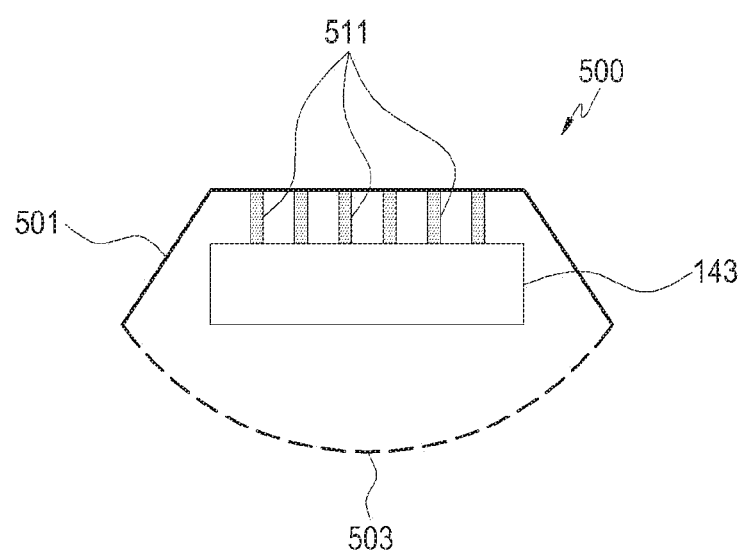
FIG. 20 is a view for describing a sectional configuration of an electronic device according to yet another one of various embodiments of the present invention.

FIG. 20 is a view for describing a cross-sectional configuration of an electronic device 500 according to yet another one of various embodiments of the present invention.

Referring to FIG. 20, metal fins 511 may be provided on the inner surface of the main body 501. The metal fins 511 individually extend from the inner surface of the main body and may be made of the same material as the main body 501. The metal fins 511 may come in contact with electronic components (e.g., the battery 143 and the processor) inside the main body 501 (e.g., within the recess). While the electronic device 500 is being operated, heat may be generated from the battery 143 or the processor, and because the metal fins 511 individually come in contact with the electronic component(s), the heat generated from the electronic component(s) can be diffused and radiated. By forming the metal fins 511, because it is possible to secure a wider contact area with the surrounding air, the heat generated from the electronic components, such as the battery 143, can be rapidly diffused and radiated. In order to facilitate heat transfer between the electronic component(s) and the metal fins 511, a thermal grease, a thermal conductive pad, and so on may be disposed between the electronic component(s) and the metal fins 511.

Figure 21:
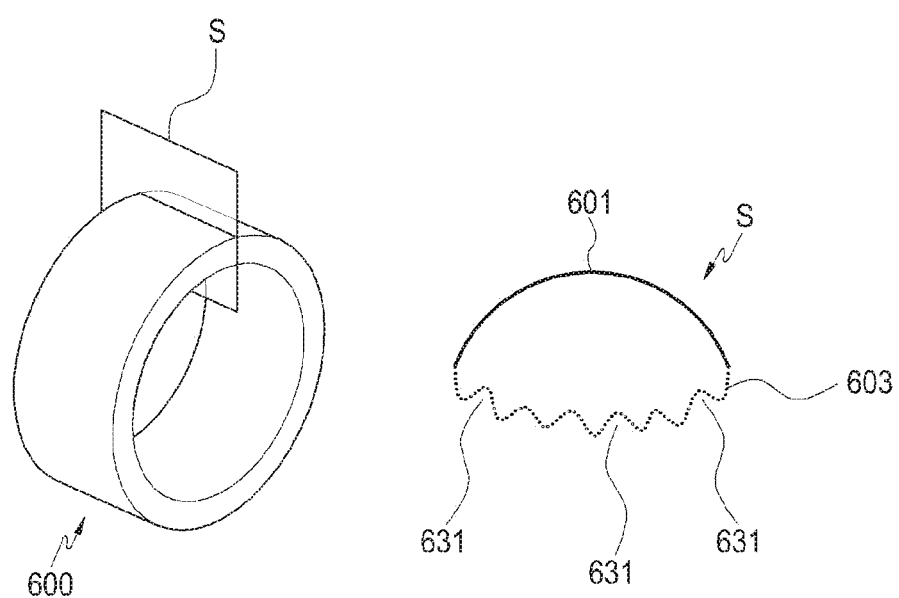
FIGS. 21 and 22 are views illustrating sectional shapes for improving a wearing feeling of an electronic device according to various embodiments of the present invention.
Figure 22:
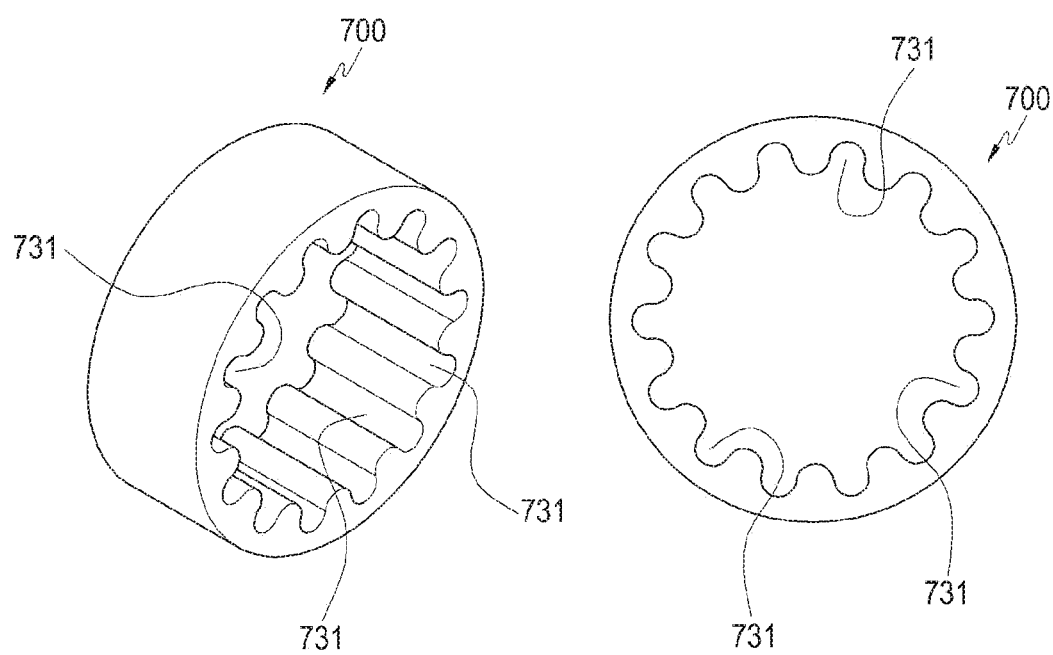

FIGS. 21 and 22 are views illustrating cross-sectional shapes for improving a wearing feeling of electronic devices 600 and 700 according to various embodiments of the present invention.

Referring to FIGS. 21 and 22, each of the electronic devices 600 and 700 may have a second recess 631 or 731 formed on a face that comes in contact with the user's body. For example, an insulator layer (e.g., an insulator layer 603) may be disposed inside the main body (e.g., the main body 601), and a second recess 631 or 731 formed in the inner surface of the insulator layer may be included. The second recesses 631 or 731 may extend in parallel with each other along the extension direction of the main body, as illustrated in FIG. 21, or may be arranged along the circumferential direction of the main body, as illustrated in FIG. 22. By forming the second recesses 631 or 731, it is possible to reduce an area in which the electronic device 600 or 700 and the user's body are contacted with each other, and a route for circulating air may be provided between the electronic device 600 or 700 and the user's body. For example, in the state where the user wears the electronic device 600 or 700, the second recesses 631 or 731 may prevent the deterioration of the wearing feeling, which may be caused by sweat or the like.

As described above, according to various embodiments of the present invention, an electronic device may include: a main body that is made of a conductive material and has opposite ends extending in a curved form to be adjacent to each other so as to form a loop shape; a communication module disposed on the main body; a feeding line extending from the communication module, and disposed across a gap between the opposite ends of the main body; and at least one connection terminal that connects the feeding line to the main body.

The main body may receive a feeding signal from the communication module through the feeding line, and may transmit/receive a wireless signal.

According to various embodiments, the connection terminal may include a first connection terminal that connects the feeding line to the main body at one side of the gap and a second connection terminal that connects the feeding line to the main body at the other side of the gap.

According to various embodiments, the electronic device may further include a flexible printed circuit board that is disposed on an inner or outer surface of the main body and includes a ground layer in a partial region thereof. The ground layer may be electrically connected to the main body at one of the one side and the other side of the gap.

According to various embodiments, one of the first and second connection terminals may be connected to the ground layer.

According to various embodiments, the feeding line may be formed inside the flexible printed circuit board.

According to various embodiments, the electronic device may further include: a second feeding line that extends from the communication module; a first connection terminal that connects an end of the feeding line to the main body at one side of the gap; and a second connection terminal that connects an end of the second feeding line to the main body at the other side of the gap.

According to various embodiments, the electronic device may further include at least one of a light emission element and a switch element. The at least one of the light emission element and the switch element may be disposed between the opposite ends of the main body.

According to various embodiments, the electronic device may further include a cover member disposed on an outer surface between the opposite ends of the main body. The cover member may be coupled to enclose the at least one of the light emission element and the switch element.

According to various embodiments, the cover member may be made of a transparent or translucent material to transmit light emitted from the light emission element.

According to various embodiments, the cover member may include an operating portion disposed to correspond to the switch element, and the operating portion may protrude to an outer surface on the main body.

According to various embodiments, the electronic device may further include at least one of a battery, a power management module, a motion sensing sensor module, a vibration module, a sound module, and a Micro Controller Module (MCU).

At least one of the battery, the power management module, the motion sensing sensor module, the vibration module, the sound module, and the MCU may be disposed on an inner or outer surface of the main body together with the communication module.

According to various embodiments, the electronic device may further include an insulator layer disposed on an inner surface of the main body.

According to various embodiments, the electronic device may further include a matching circuit disposed on the feeding line.

According to various embodiments, the feeding line may be located adjacent to one of opposite sides of the main body and may extend along an extension direction of the main body in parallel with the extension direction.

According to various embodiments, the electronic device may further include a recess formed on an inner or outer surface of the main body and extends in an extension direction of the main body. The feeding line may be disposed within the recess.

According to various embodiments, the electronic device may further include an insulator layer disposed on an inner surface of the main body.

According to various embodiments, the electronic device may further include second recesses formed on the inner surface of the main body. The main body may extend to form a ring shape, and the second recesses may be arranged on the inner surface of the main body along a circumferential direction, or may extend along the circumferential direction in parallel to each other.

In addition, an electronic device according to various embodiments of the present invention is an electronic device that transmits/receives a Radio Frequency (RF) signal.

The electronic device may include:
a. an antenna (e.g., the above-mentioned main body 101 or 201) that is partially formed of a conductive material to transmit/receive the RF signal, and has a cross section having a width and a thickness and a donut ring shape having a diameter, the antenna having at least one discontinuous portion that forms a narrow gap (e.g., the above-mentioned narrow gap 111);
b. at least one recess (e.g., the above-mentioned recess 115 or 215) formed on an inner or outer surface of the antenna, and having a width and a depth, the recess being formed to be continued along most of a circumference of the antenna;
c. a flexible printed circuit board (e.g., the above-mentioned printed circuit board 102) installed within the recess, and including a conductive layer that is connected at least one of a battery (the above-mentioned battery 143), a power management module (e.g., the charging/discharging integrate circuit 144), a motion sensing sensor module (e.g., the above-mentioned motion sensing sensor module 145), a vibration module, a sound module (e.g., the above-mentioned input/output module 146), and an MCU (e.g., the above-mentioned processor 141); and
d. an insulator layer (the above-mentioned insulator layer 103, 203a, or 203b) filled in the recess to conceal electronic components including the flexible printed circuit board.

According to various embodiments, the electronic device may further include a second insulator layer (e.g., the above-mentioned insulator layer 103 or 203a) formed on a surface of a conductor portion on the inner surface of the antenna. The recess may be formed on the outer surface of the antenna.

According to various embodiments, the antenna may have any one shape selected from an oval peripheral surface, a rectangular cross section, a circular cross section, and a polygonal cross section (e.g., the cross-sectional shapes illustrated in FIG. 19 and so on).

According to various embodiments, the recess may have a concave curvature or an at least partially convex curvature (e.g., the cross-sectional shapes illustrated in FIG. 19 and so on).

According to various embodiments, the conductive material forming the antenna consists of at least one of stainless steel, aluminum, and titanium.

According to various embodiments, the conductive layer of the flexible printed circuit board may include: at least one feeding line (e.g., the above-mentioned feeding lines 123 and 223a) extending across the narrow gap; and at least one connection terminal (e.g., the above-mentioned connection terminals 123a and 223c) connects the feeding line to the antenna on at least one side of the narrow gap.

According to various embodiments, the feeding line may include a first feeding line (e.g., the above-mentioned feeding line 223a) extending to one side of the narrow gap across the narrow gap, and a second feeding line (e.g., the above-mentioned feeding line 223b) extending from the other side of the narrow gap.

The connection terminal may include a first connection terminal (e.g., the above-mentioned connection terminal 223c) that connects the first feeding line to the antenna at one side of the narrow gap and a second connection terminal (e.g., the above-mentioned connection terminal 223d) that connects the second feeding line to the antenna at the other side of the narrow gap.

The antenna may receive a differential RF signal through the first and second feeding lines and the first and second connection terminals.

According to various embodiments, the electronic device may further include metal fins (e.g., the above-mentioned metal fins 511) formed within the recess and a battery disposed within the recess. The metal fins may be in contact with the battery to diffuse and radiate heat generated from the battery.

According to various embodiments, the electronic device may further include a second insulator layer (e.g., the above-mentioned insulator layer 603) formed on a surface of a conductive portion on the inner surface of the antenna, and second recesses (e.g., the above-mentioned second recesses 631 and 731) formed on the inner surface of the second insulator layer. The second recesses may be arranged along a circumferential direction of the antenna, or may extend along the circumferential direction in parallel to each other.

While the present invention has been shown and described with reference to certain embodiments thereof, it will be understood by those skilled in the art that various changes in form and details may be made therein without departing from the spirit and scope of the present invention as defined by the appended claims.

The invention claimed is:

1. An electronic device comprising:
a main body that is made of a conductive material and has opposite ends extending in a curved form to be adjacent to each other so as to form a loop shape;
a cover member that is made of an insulating material and disposed in a gap formed between the opposite ends of the main body;
a communication module disposed on the main body;
a feeding line extending from the communication module, and disposed across the gap between the opposite ends of the main body; and
at least one connection terminal that connects the feeding line to the main body,
wherein the communication module is configured to be provide with a wireless signal received from the main body through the feeding line.

2. An electronic device comprising:
a main body that is made of a conductive material and has opposite ends extending in a curved form to be adjacent to each other so as to form a loop shape;
a communication module disposed on the main body;
a feeding line extending from the communication module, and disposed across a gap between the opposite ends of the main body; and
at least one connection terminal that connects the feeding line to the main body,
wherein the communication module is configured to be provide with a wireless signal received from the main body through the feeding line, and
wherein the connection terminal includes a first connection terminal that connects the feeding line to the main body at one side of the gap and a second connection terminal that connects the feeding line to the main body at the other side of the gap.

3. The electronic device of claim 2, further comprising a flexible printed circuit board that is disposed on an inner surface or an outer surface of the main body and includes a ground layer in a partial region thereof,
wherein the ground layer is electrically connected to the main body at one of the one side and the other side of the gap.

4. The electronic device of claim 3, wherein one of the first and second connection terminals is connected to the ground layer.

5. The electronic device of claim 3, wherein the feeding line is formed inside the flexible printed circuit board.

6. An electronic device comprising:
a main body that is made of a conductive material and has opposite ends extending in a curved form to be adjacent to each other so as to form a loop shape;
a communication module disposed on the main body;
a feeding line extending from the communication module, and disposed across a gap between the opposite ends of the main body; and
at least one connection terminal that connects the feeding line to the main body,
wherein the communication module is configured to be provide with a wireless signal received from the main body through the feeding line, and
wherein the electronic device further comprises:
a second feeding line that extends from the communication module;
a first connection terminal that connects an end of the feeding line to the main body at one side of the gap; and
a second connection terminal that connects an end of the second feeding line to the main body at the other side of the gap.

7. An electronic device comprising:
a main body that is made of a conductive material and has opposite ends extending in a curved form to be adjacent to each other so as to form a loop shape;
a communication module disposed on the main body;
a feeding line extending from the communication module, and disposed across a gap between the opposite ends of the main body; and
at least one connection terminal that connects the feeding line to the main body,
wherein the communication module is configured to be provide with a wireless signal received from the main body through the feeding line,
wherein the electronic device further comprises at least one of a light emission element and a switch element, and
wherein the at least one of the light emission element and the switch element is disposed between the opposite ends of the main body.

8. The electronic device of claim 7, further comprising a cover member disposed on an outer surface and between the opposite ends of the main body, wherein the cover member is coupled to enclose the at least one of the light emission element and the switch element.

9. The electronic device of claim 8, wherein the cover member is made of a transparent or translucent material to transmit light emitted from the light emission element.

10. The electronic device of claim 8, wherein the cover member includes an operating portion disposed to correspond to the switch element, and
the operating portion protrudes to an outer surface on the main body.

11. An electronic device comprising:
a main body that is made of a conductive material and has opposite ends extending in a curved form to be adjacent to each other so as to form a loop shape;
a communication module disposed on the main body;
a feeding line extending from the communication module, and disposed across a gap between the opposite ends of the main body; and
at least one connection terminal that connects the feeding line to the main body,
wherein the communication module is configured to be provide with a wireless signal received from the main body through the feeding line,
wherein the electronic device further comprises at least one of a battery, a power management module, a motion sensing sensor module, a vibration module, a sound module, and a Micro Controller Module (MCU), and
wherein the at least one of the battery, the power management module, the motion sensing sensor module, the vibration module, the sound module, and the MCU is disposed on an inner surface or an outer surface of the main body together with the communication module.

12. The electronic device of claim 1, further comprising an insulator layer disposed on an inner surface of the main body.

13. The electronic device of claim 1, further comprising a matching circuit disposed on the feeding line.

14. An electronic device comprising:
a main body that is made of a conductive material and has opposite ends extending in a curved form to be adjacent to each other so as to form a loop shape;
a communication module disposed on the main body;
a feeding line extending from the communication module, and disposed across a gap between the opposite ends of the main body; and
at least one connection terminal that connects the feeding line to the main body,
wherein the communication module is configured to be provide with a wireless signal received from the main body through the feeding line, and
wherein the feeding line is located adjacent to one of opposite sides of the main body and extends along an extension direction of the main body in parallel with the extension direction.

15. An electronic device comprising:
a main body that is made of a conductive material and has opposite ends extending in a curved form to be adjacent to each other so as to form a loop shape;
a communication module disposed on the main body;
a feeding line extending from the communication module, and disposed across a gap between the opposite ends of the main body; and
at least one connection terminal that connects the feeding line to the main body,
wherein the communication module is configured to be provide with a wireless signal received from the main body through the feeding line,
wherein the electronic device further comprises a recess formed on an inner or outer surface of the main body and extends in an extension direction of the main body, and
wherein the feeding line is disposed within the recess.

16. The electronic device of claim 15, further comprising an insulator layer formed to fill the recess.

17. The electronic device of claim 15, further comprising second recesses formed on the inner surface of the main body,
wherein the main body extends to form a ring shape, and the second recesses are arranged on the inner surface of the main body along a circumferential direction, or extend along the circumferential direction in parallel to each other.

18. An electronic device that transmits/receives a Radio Frequency (RF) signal, the electronic device comprising:
a. an antenna that is partially formed of a conductive material to transmit/receive the RF signal, and has a cross section having a width and a thickness and a donut ring shape having a diameter, the antenna having at least one discontinuous portion that forms a narrow gap;
b. at least one recess formed on an inner or outer surface of the antenna, and having a width and a depth, the recess being formed to be continued along most of a circumference of the antenna;
c. a flexible printed circuit board installed within the recess, and including a conductive layer that is connected at least one of a battery, a power management module, a motion sensing sensor module, a vibration module, a sound module, and an MCU that are disposed in the narrow gap or the recess; and
d. an insulator layer filled in the recess to conceal electronic components including the flexible printed circuit board.

19. The electronic device of claim 18, further comprising a second insulator layer formed on a surface of a conductive portion on the inner surface of the antenna,
wherein the recess is formed on the outer surface of the antenna.

20. The electronic device of claim 18, wherein the antenna has any one shape selected from an oval peripheral surface, a rectangular cross section, a circular cross section, a polygonal cross section.

21. The electronic device of claim 18, wherein the recess has a concave curvature or at least partially convex curvature.

22. The electronic device of claim 18, wherein the conductive material forming the antenna consists of at least one of stainless steel, aluminum, and titanium.

23. The electronic device of claim 18, wherein the conductive layer of the flexible printed circuit board includes:
at least one feeding line extending across the narrow gap; and
at least one connection terminal connects the feeding line to the antenna on at least one side of the narrow gap.

24. The electronic device of claim 23, wherein the feeding line includes a first feeding line extending to one side of the narrow gap across the narrow gap, and a second feeding line extending from the other side of the narrow gap,
the connection terminal includes a first connection terminal that connects the first feeding line to the antenna at one side of the narrow gap and a second connection terminal that connects the second feeding line to the antenna at the other side of the narrow gap, and the antenna receives a differential RF signal through the first and second feeding lines and the first and second connection terminals.

25. The electronic device of claim 18, further comprising metal fins formed within the recess and a battery disposed within the recess, wherein the metal fins are in contact with the battery to diffuse and radiate heat generated from the battery.

26. The electronic device of claim 18, further comprising a second insulator layer formed on a surface of a conductive portion on the inner surface of the antenna, and second recesses formed on the inner surface of the second insulator layer, wherein the second recesses are arranged along a circumferential direction of the antenna, or extend along the circumferential direction in parallel to each other.

\* \* \* \* \*